(12) United States Patent
Giemza et al.

(10) Patent No.: US 11,536,000 B2
(45) Date of Patent: Dec. 27, 2022

(54) CAPPING ASSEMBLY

(71) Applicant: GRIPPLE LIMITED, Sheffield (GB)

(72) Inventors: Lee Giemza, Wakefield (GB); Thomas Edward Fisher, Sheffield (GB); John Butterworth, Sheffield (GB)

(73) Assignee: GRIPPLE LIMITED

( * ) Notice: Subject to any disclaimer, the term of this patent is extended or adjusted under 35 U.S.C. 154(b) by 194 days.

(21) Appl. No.: 16/771,155

(22) PCT Filed: Dec. 19, 2018

(86) PCT No.: PCT/GB2018/000158
§ 371 (c)(1),
(2) Date: Jun. 9, 2020

(87) PCT Pub. No.: WO2019/138204
PCT Pub. Date: Jul. 18, 2019

(65) Prior Publication Data
US 2021/0172145 A1     Jun. 10, 2021

(30) Foreign Application Priority Data

Jan. 12, 2018 (GB) .................................. 1800567
Jan. 15, 2018 (GB) .................................. 1800605
Dec. 18, 2018 (GB) .................................. 1820621

(51) Int. Cl.
*E02D 5/80* (2006.01)
*E02D 17/20* (2006.01)
(Continued)

(52) U.S. Cl.
CPC ................ *E02D 5/80* (2013.01); *B09B 1/004* (2013.01); *E02D 17/202* (2013.01); *F16G 11/108* (2013.01)

(58) Field of Classification Search
CPC ........... E02D 5/80; E02D 5/83; E02D 17/202; B09B 1/004; F16G 11/108
See application file for complete search history.

(56) References Cited

U.S. PATENT DOCUMENTS 2,207,049 A * 7/1940 Chance .................... E02D 5/80
52/166
5,171,108 A * 12/1992 Hugron .................... E02D 5/80
52/166
(Continued)

FOREIGN PATENT DOCUMENTS

EP     2385174 A1    9/2011
GB     2514004 A    11/2014
(Continued)

OTHER PUBLICATIONS

First Examination Report which issued in connection with a corresponding foreign application on Jul. 1, 2022.

*Primary Examiner* — Benjamin F Fiorello
(74) *Attorney, Agent, or Firm* — Clark Hill PLC; James R. Foley

(57) ABSTRACT

A capping assembly (10) for mounting on a covering (12) is disclosed. The capping assembly (10) comprises a cap (14) which can be disposed on the covering (12), a securing arrangement (18) to enable the capping assembly (10) to be secured on the covering (12). The capping assembly (10) further includes an insertion member (16) for insertion through the covering (12). The cap (14) can be attached to the insertion member (16). The securing arrangement (18) comprises a securing device (20) and a holding formation (44) to hold the securing device (20), the holding formation (44) being provided on the insertion member (16).

16 Claims, 26 Drawing Sheets

(51) Int. Cl.
*B09B 1/00* (2006.01)
*F16G 11/10* (2006.01)

(56) References Cited

U.S. PATENT DOCUMENTS

| | | | |
|---|---|---|---|
| 7,828,499 B2* | 11/2010 | Carpenter | E02D 5/805 |
| | | | 405/16 |
| 8,157,482 B2* | 4/2012 | Carpenter | E02D 5/80 |
| | | | 52/156 |
| 10,639,775 B2* | 5/2020 | Tilley | B25B 23/10 |
| 2009/0007502 A1* | 1/2009 | Roy | E02D 5/80 |
| | | | 52/159 |
| 2014/0037387 A1* | 2/2014 | Ferreira | F16G 11/108 |
| | | | 405/259.1 |
| 2014/0112723 A1* | 4/2014 | Daniel | E02D 5/80 |
| | | | 405/259.1 |
| 2014/0189985 A1 | 7/2014 | McDowell | |
| 2017/0218593 A1* | 8/2017 | Butterworth | E02D 17/202 |

FOREIGN PATENT DOCUMENTS

| | | |
|---|---|---|
| GB | 2516533 A | 1/2015 |
| GB | 2551902 A | 1/2018 |
| KR | 100879803 B | 1/2009 |
| KR | 1020130005485 B | 1/2013 |

\* cited by examiner

CAPPING ASSEMBLY

This invention relates to capping assemblies. More particularly, but not exclusively, this invention relates to capping assemblies for use to secure coverings on landfill sites. Embodiments of the invention relate to landfill caps.

In landfill sites, the landfill is covered with a covering that is secured on the landfill by sandbags and tyres, which weigh down the covering. Alternatively, a plurality of landfill caps can be used. Each cap is tethered by a wire rope, cable or the like to an anchor driven into the ground. The cap is attached to the covering by means of an adhesive around the edge of the cap.

According to one aspect of this invention, there is provided a capping assembly for use on a covering, the capping assembly comprising a cap which can be disposed on the covering, a securing arrangement to enable the cap to be secured on the covering, and a sealing portion on the cap for sealing the cap against the covering, the sealing portion extending around the securing arrangement.

The capping assembly may further include an insertion member for insertion through the covering, wherein the cap can be attached to the insertion member.

According to another aspect of this invention, there is provided a capping assembly for mounting on a covering, the capping assembly comprising a cap which can be disposed on the covering, a securing arrangement to enable the capping assembly to be secured on the covering, and an insertion member for insertion through the covering, wherein the cap can be attached to the insertion member.

According to another aspect of this invention, there is provided a method of mounting a capping assembly on a covering, wherein the method comprises providing an insertion member, inserting the insertion member through the covering, providing a cap, disposing the cap on the covering and attaching the cap to the insertion member, wherein the method further includes providing a securing arrangement and securing the capping assembly to the covering The cap and the insertion member may together constitute a clamping assembly for clamping the covering. The securing arrangement may be provided on the insertion member.

The covering may be a covering membrane.

The securing arrangement may comprise a securing device. In one embodiment, the securing arrangement may comprise a holding formation that can hold the securing device. The method may comprise disposing the securing device on the holding formation.

The securing device may be held by the clamping assembly. Conveniently, the holding formation is provided on the insertion member.

The securing arrangement may include a tethering assembly to secure the capping assembly to the ground. The tethering assembly may comprise a tethering member. The tethering member may be elongate. The tethering assembly may further include a ground anchor.

The tethering member may be provided to tether the clamping assembly to the ground anchor. The tethering member may be attached to the ground anchor. The tethering member may be secured to the securing device. The method may include driving the ground anchor into the ground with the tethering member attached thereto.

The ground anchor may be a ground anchor described in published patent application No. GB2514004. The ground anchor may be driven into the ground as described in published patent application No. GB2514004. The tethering member may be a wire rope, cable or the like.

The method may further include securing the tethering member to the securing device. Conveniently, the tethering member is secured to the securing device after the ground anchor is driven into the ground.

The securing device may comprise a gripping device for gripping the tethering member and attaching the tethering member to the clamping assembly.

The clamping assembly may define an aperture. The insertion member may define the aperture. A portion of the securing device may extend through the aperture. The portion of the securing device extending through the aperture may grip the tethering member. In the embodiment described herein, the securing device may be as described in published patent application No. GB2516533.

The securing device may have a body and a projection extending from the body. The projection may extend from an upper region of the body. The projection may comprise a flange. The body may extend through the aperture in the insertion member, and the projection may engage the insertion member to hold the securing device thereon.

The insertion member may have first and second perpendicular dimensions, wherein the first dimension is longer than the second dimension. The first dimension may be a length of the insertion member. The second dimension may be a width of the insertion member.

The method may comprise forming an opening in the covering, for example by cutting. The opening may be an elongate opening, and may be a slit. The opening may have a length that is greater than the second dimension of the insertion member. The length of the opening may be less than the first dimension.

The method may further comprise inserting the insertion member through the opening lengthwise in an orientation in which the first dimension extends transverse to the opening.

The insertion member may comprise a main part. The main part may define the aperture through which the securing device may extend.

The aperture may be elongate to allow the tethering member to extend at an angle to the main part when the main part is inserted through the opening in the covering. The aperture may extend along the first dimension of the main part.

The insertion member may include a peripheral portion, which may have an engaging surface for engaging the covering. The engaging surface may extend around the main part. The engaging surface may be substantially planar. The main part may have a domed configuration.

The capping assembly may further include an orienting arrangement to orient the insertion member when the insertion member has been inserted through the opening. The orienting arrangement may be manipulable to orient the insertion member to a desired orientation. In one embodiment, in the desired orientation, the first dimension of the insertion member extends parallel to the length of the opening.

The method may comprise manipulating the orienting arrangement to move the insertion member to a sealing position in which the first dimension of the insertion member extends parallel to the opening. The manipulation of the orienting arrangement may comprise rotating the insertion member to the sealing position.

The orienting arrangement may comprise an elongate flexible orienting member. Desirably, the orienting arrangement may comprise two of the elongate flexible orienting members. Each orienting member may be attached to the insertion member at different points along the first dimension thereof.

When the insertion member has been oriented to the sealing position, the method may comprise pulling the tethering member through the securing device to tighten the securing device against the insertion member.

The method may include cutting the tethering member above the insertion member when the securing device has been tightened against insertion member. The method may include cutting the, or each, orienting member when the insertion member has been oriented to the sealing position.

The capping assembly may comprise a sealing portion to engage and seal against the covering. The sealing portion may be formed of a suitable resilient material. The resilient material may be a foam material. The sealing portion may be provided on the cap.

The cap may have a shape that corresponds to the shape of the insertion member. Desirably, the cap may have a central portion, which may have a raised configuration. The cap may include an outer portion, which may extend around the central portion. The outer portion may have a sealing surface.

The cap may include ribs extending from the central portion. The ribs may extend across the outer portion. The sealing portion may be provided on the sealing surface to seal around the opening in the covering.

The cap may be disposed on the covering, over the insertion member. The cap may include cooperating members which may project from the central portion. The cooperating members may project to a region beyond the outer portion. In use, the cooperating members may extend through the covering membrane. The insertion member may include a cooperating formation for cooperating with the cooperating members and holding the cap on the insertion member. The cooperating formation may comprise an edge of the aperture.

The cap may comprise a central portion, an outer portion extending around the central portion, and cooperating members which project from the central portion. The insertion member may include a cooperating formation for cooperating with the cooperating members and holding the cap on the insertion member. The method may include disposing the cap on the covering over the insertion member, whereby the cooperating members extend through the covering to cooperate with the cooperating formations.

When the cap is brought towards the covering, the cooperating members may extend through the opening therein. When the sealing portion sealingly engages the covering, the cooperating members cooperate with the second cooperating formations to hold the cap on the insertion member.

The capping assembly may further include fasteners, such as screws, that can extend through suitable holes in the cap to be received by holes in the insertion member. Thus the cap and the insertion member can be fastened to each other, thereby clamping the covering between the insertion member and the cap.

An embodiment of the invention will now described by way of example only, with reference to the accompanying drawings, in which.

Figure 1:
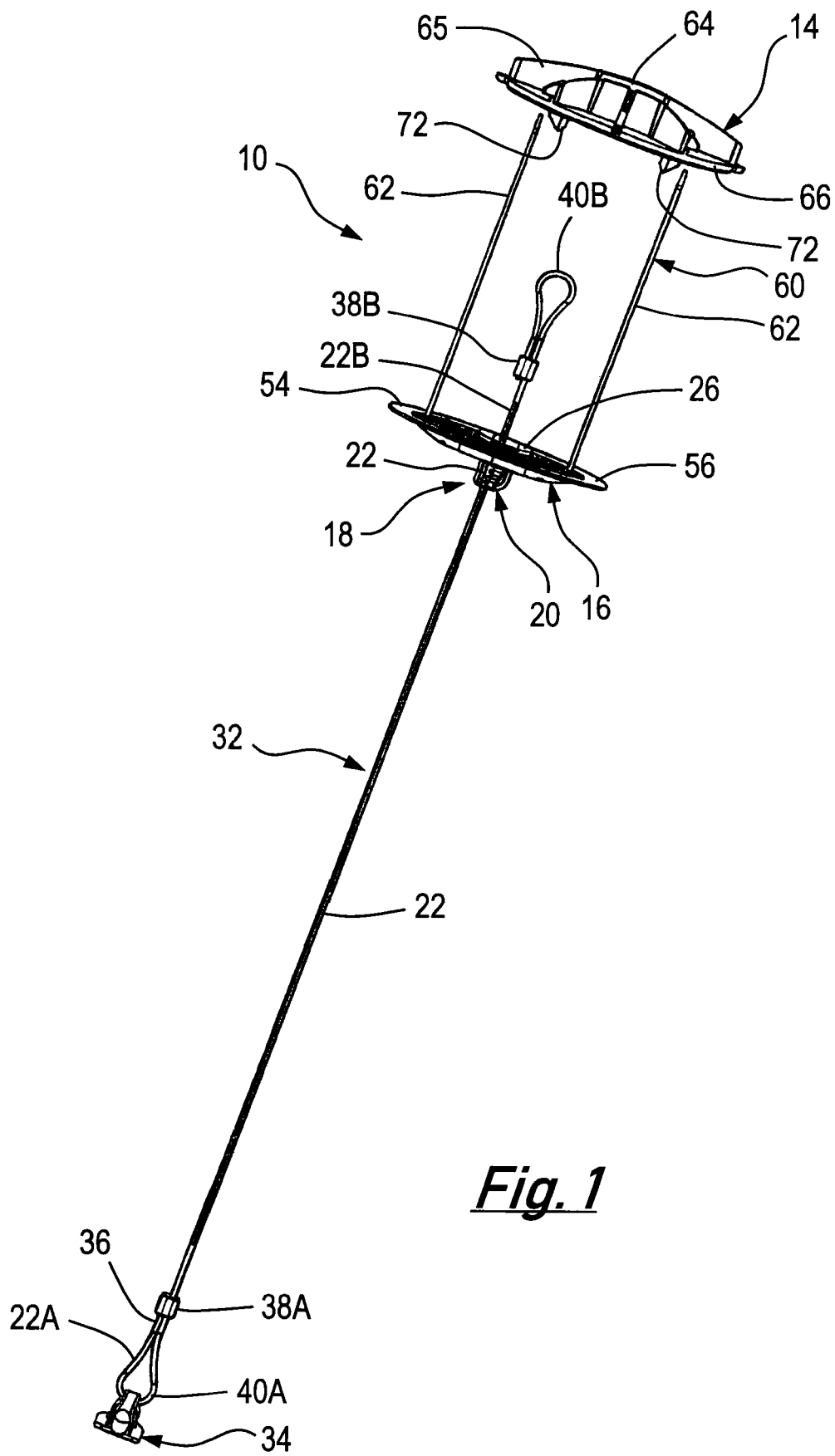
FIG. 1 is a side view of a capping assembly.
Figure 2:
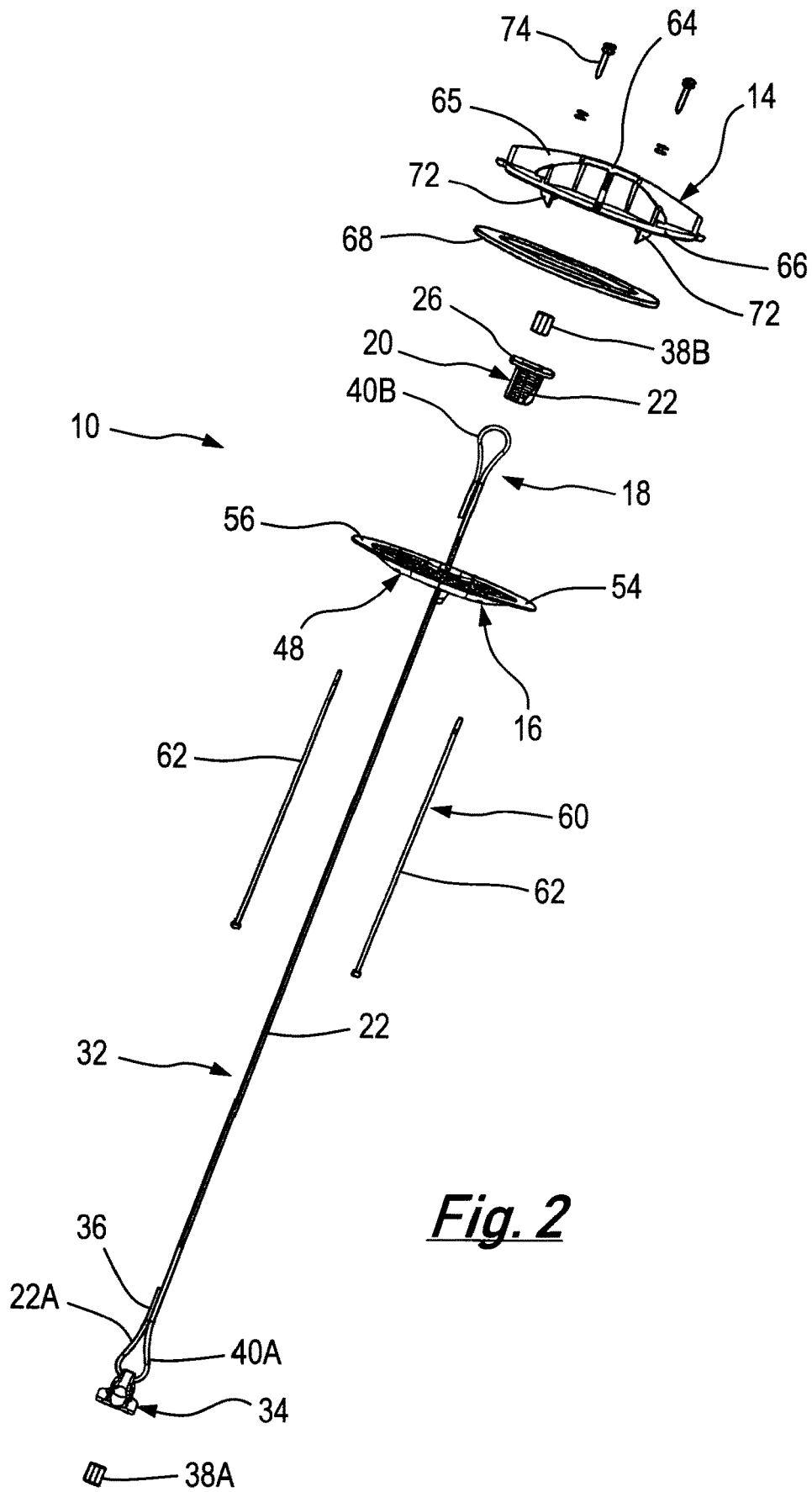
FIG. 2 is an explode view of the capping assembly shown in FIG. 1.

FIG. 1 shows a capping assembly 10 which can be mounted on a covering in the form of a covering membrane 12, for example a covering membrane 12 over a landfill site. FIG. 2 is an exploded view of the capping assembly 10.

The capping assembly 10 comprises a cap 14 which can be disposed on the covering membrane 12, and an insertion member 16 for insertion through the covering membrane 12.

The cap 14 can be fastened to the insertion member 16, thereby constituting a clamping assembly to clamp the covering membrane 12 between the cap 14 and the insertion member 16, as explained below. A securing arrangement 18 is provided to enable the capping assembly 10 to be secured on the covering.

The securing arrangement 18 comprises a securing device in the form of a gripping device 20 for gripping an elongate tethering member 22, such as a cable, wire, wire rope or the like. The gripping device 20 is held by the insertion member 16. The gripping device 20 may be as described in published UK patent application No. GB 2516533

Figure 3:
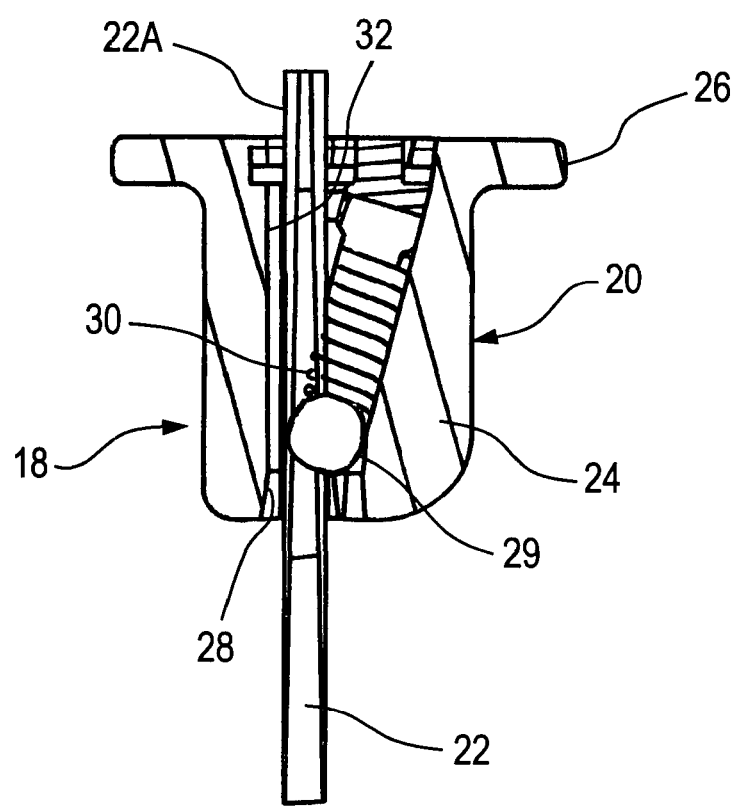
FIG. 3 is a sectional side view of a gripping device.

A sectional view of the gripping device 20 is shown in FIG. 3, and brief details are as follows. The gripping device 20 has a body 24 and a flange 26 extending outwardly from an upper end of the body 24. In the embodiment shown, the flange 26 extends all the way round the body 24.

The gripping device 20 defines a passage 28 through which the tethering member 22 can extend. The gripping device 20 comprises a gripping member 29 and a spring 30. The gripping member 29 is urged towards the passage 28 by a spring 30 to grip the tethering member 22 between the gripping member 29 and the wall 32 of the passage 28.

The securing arrangement 18 further includes a tethering assembly 32 to secure the capping assembly 10 to the ground. The tethering assembly 32 comprises the elongate tethering member 22 and a ground anchor 34. The tethering member 22 is provided to tether the clamping assembly to the ground anchor 34.

A lower end region 22A of the tethering member 22 is attached to the ground anchor 34. The lower end 36 of the tethering member 22 is passed through an eye 37 of the anchor 34. A loop 40 is then formed in the lower end region 22A of the tethering member 22. The lower end 36 is the secured to the tethering member 22 above the ground anchor 34 by a ferrule 38.

The upper opposite end region 22B of the tethering member 22 is gripped by the gripping device 20, as shown in FIG. 3. The upper end region 22B is formed into a loop 40B secured by a further ferrule 38B for the purpose of pulling the tethering member 22 relative to the gripping device 20 so that the tethering member 22 is gripped tightly by the gripping device 20.

The ground anchor 34 may be as described in published UK patent application No. GB2514004. The ground anchor 34 may be driven into the ground as described in that published application.

Figure 4:
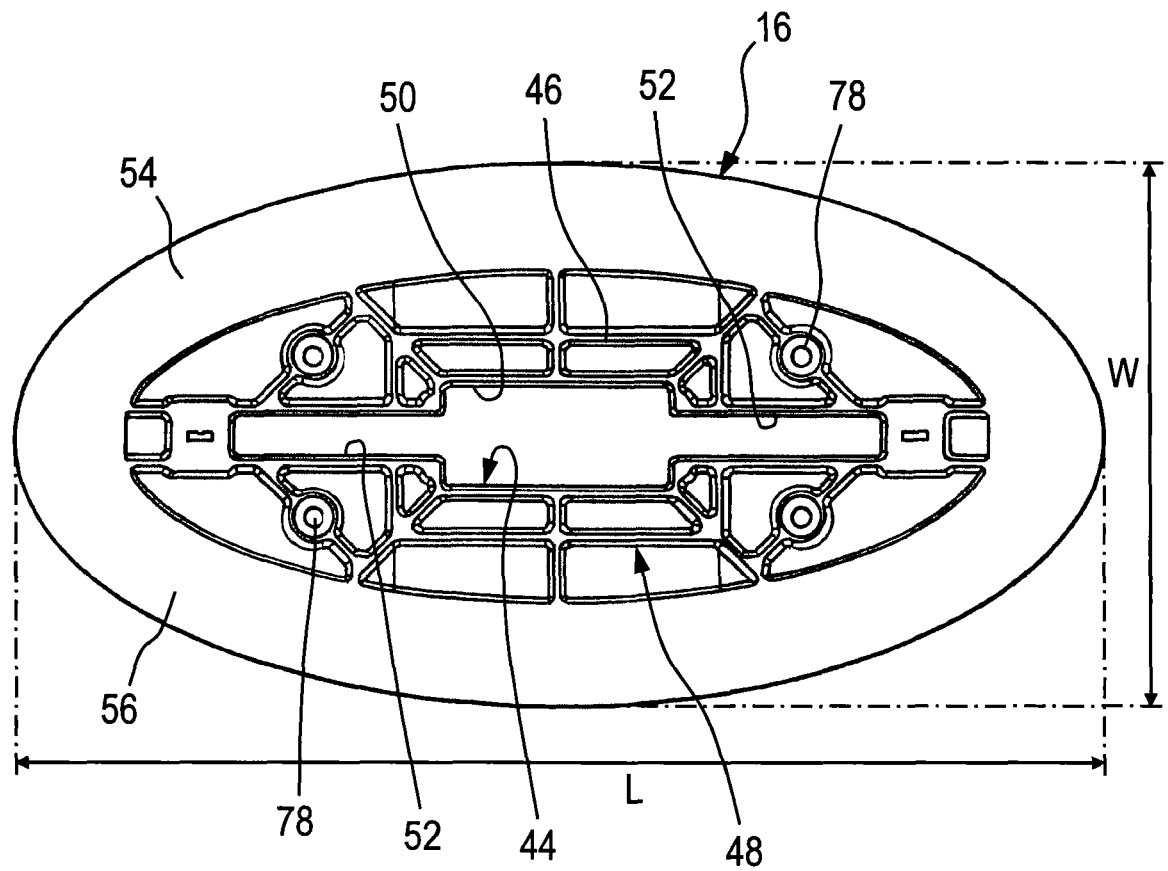
FIG. 4 is a top view of an insertion member.
Figure 5:
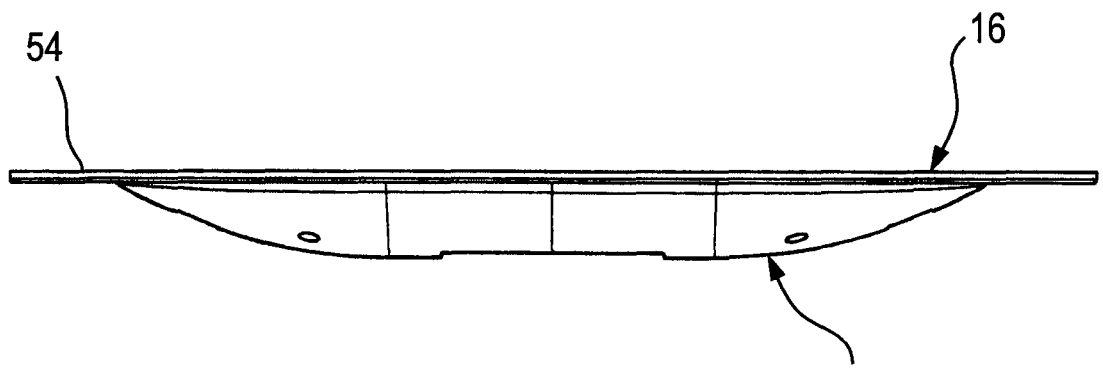
FIG. 5 is a side view of an insertion member.

FIGS. 4 and 5 show the insertion member 16, which is oval. The insertion member 16 has a first dimension which, in the embodiment shown is a length dimension L, and a second dimension perpendicular thereto. In the embodiment shown, the second dimension is a width dimension W. The length dimension L is longer than the width dimension W.

Figure 7:
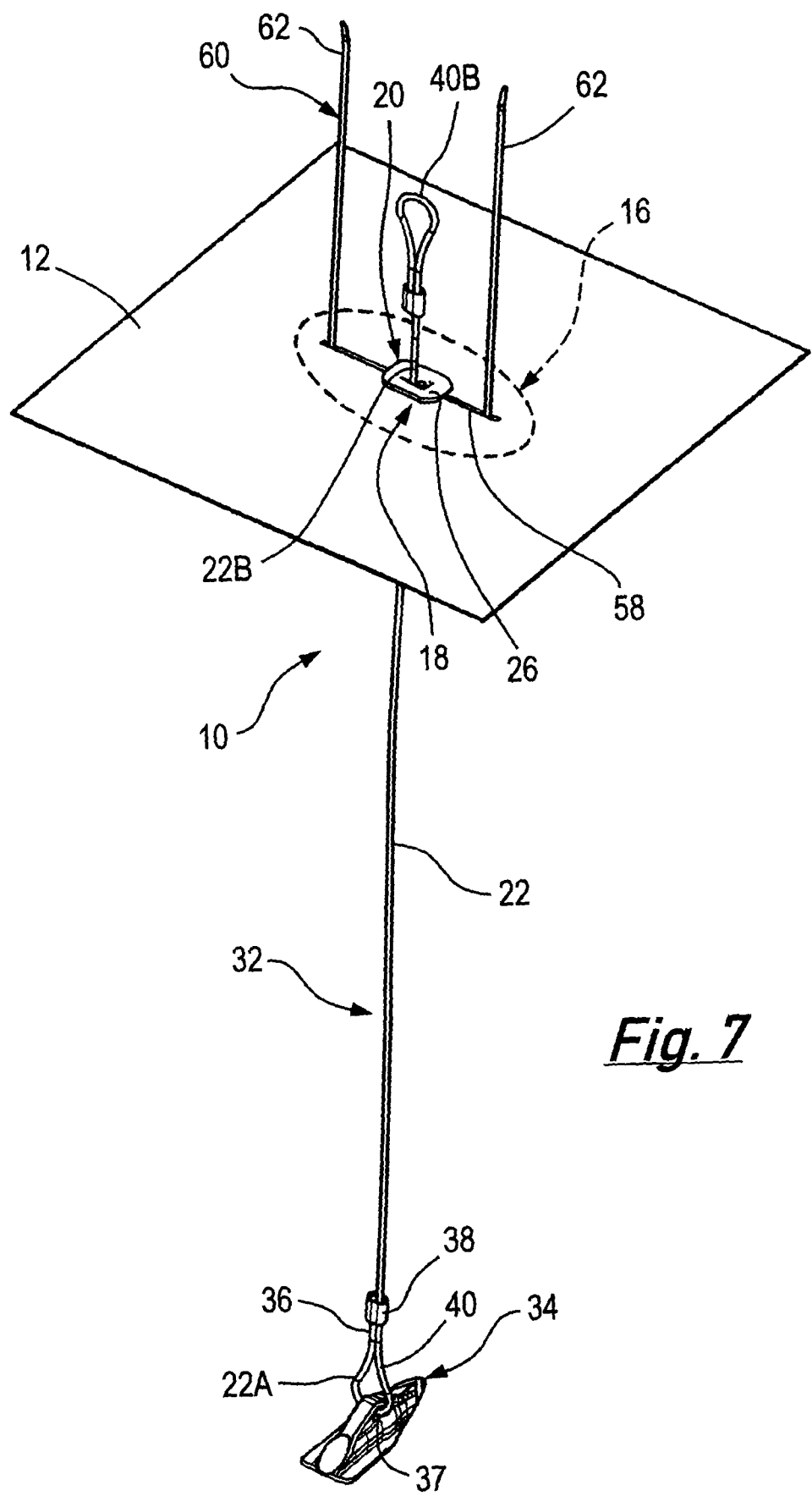
FIG. 7 shows a further step in the installation of the capping assembly, in which the insertion member is in a sealing position.
Figure 8:
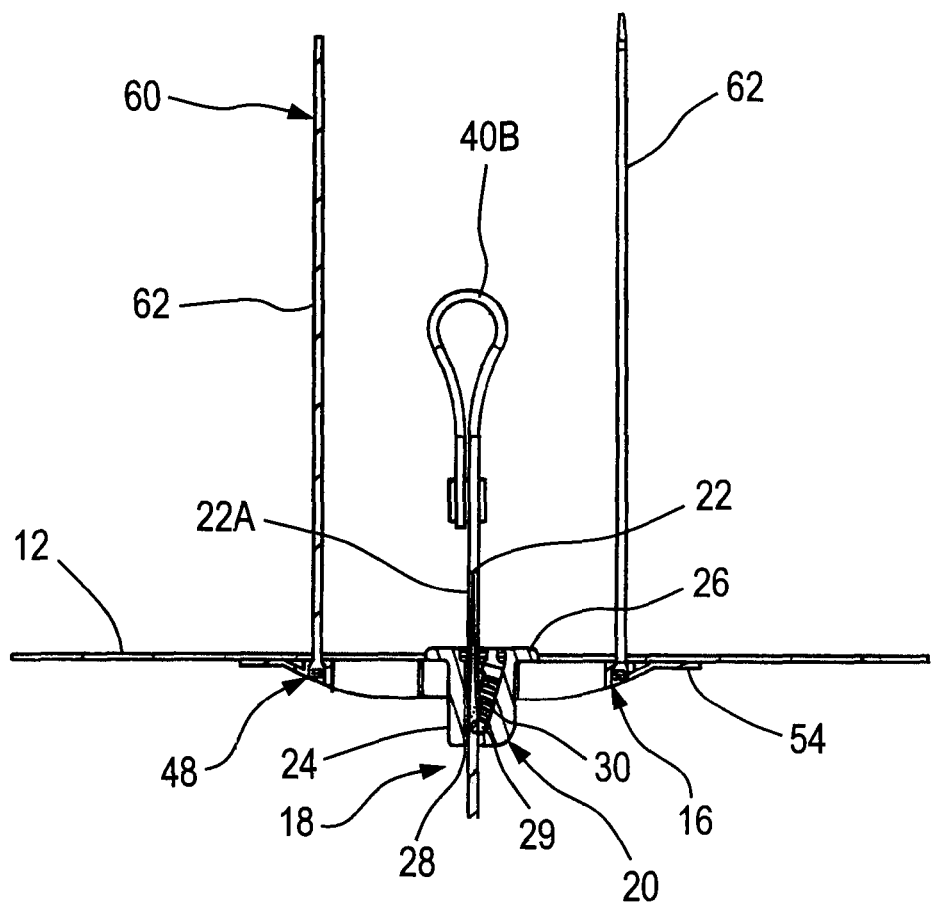
FIG. 8 is a sectional side view showing the insertion member in the sealing position.

The insertion member 16 includes part of the securing arrangement 18, namely a holding formation in the form of an aperture 44 defined by the insertion member 16, and a support portion 46 surrounding the aperture 44. The aperture 44 can receive the gripping device 20 therethrough, and when so received, the body 24 extends through the aperture 44 and through the slit 58. The covering membrane 12 is trapped between the flange 26 and the support portion 46, as shown in FIG. 7. Alternatively, the flange 26 as well as the body 24 can be inserted through the slit 58 to engage said surrounding support portion 46 of the insertion member 16. In both cases, the gripping device 20 is held on the insertion member 16 by the support portion 46 surrounding the aperture 44.

The insertion member 16 comprises a main part 48 having a domed configuration. The main part 48 defines the aperture 44 through which the gripping device 20 extends.

Figure 6:
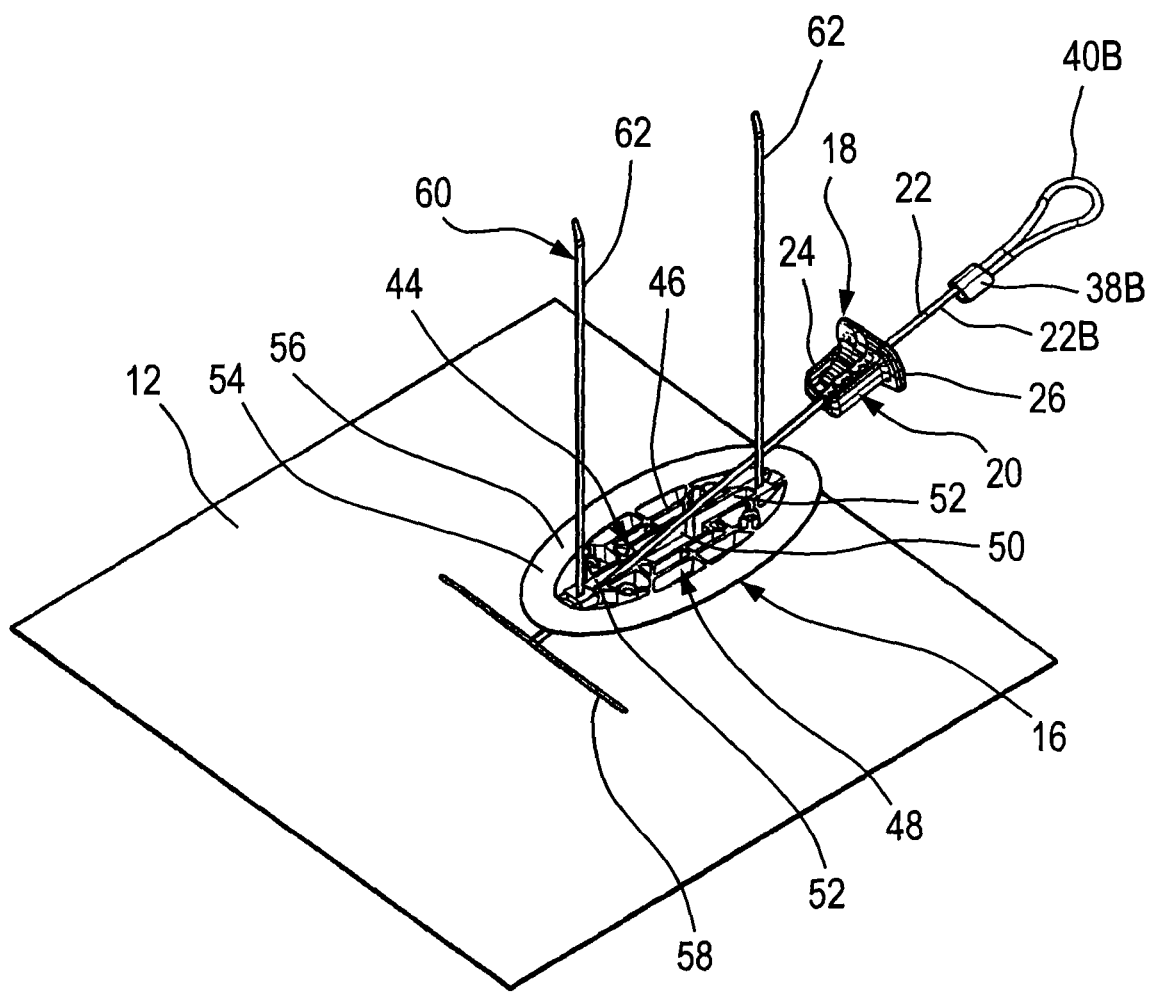
FIG. 6 is a perspective view showing a step in a method of installing the capping assembly, in which the insertion member is about to be inserted through a slit in a covering membrane.

As shown in FIG. 4, the aperture 44 is elongate, having a wide central region 50 and outer elongate narrower regions 52 extending in opposite directions from the central region 50. The elongate configuration of the aperture 44 allows the tethering member 22 to extend at an angle to the main part 48 when the main part 48 is inserted through the slit 58 in the covering (see FIG. 6). The aperture 44 is defined centrally of the insertion member 16, and extends along some of the length of the main part 48.

The insertion member 16 also includes a peripheral portion 54 which extends around the main part 48. The peripheral portion 54 has a substantially planar engaging surface 56 for engaging the covering membrane 12.

FIGS. 6 to 9 show the steps for inserting the insertion member 16 through the covering membrane 12 and thereafter arranging the insertion member 16 a desired orientation. In order to insert the insertion member 16 through the covering membrane 12, an elongate opening, in the form of a slit 58, is cut in the covering membrane 12. The slit 58 is longer than the width dimension W of the insertion member 16, but shorter than the length dimension L of the insertion member 16. The insertion member 16 is then inserted through the slit 58 in an orientation in which the length dimension L of the insertion member 16 extends transverse to the slit 58.

The capping assembly 10 further includes an orienting arrangement 60 to orient the insertion member 16 to a desired orientation after the insertion member 16 has been inserted through the aperture 44. The orienting arrangement 60 comprises two elongate flexible orienting members 62. The orienting members 62 are attached to the insertion member 16 at opposite end regions of the main part 48 of the insertion member 16. The slit 58 in the covering membrane 12 is cut so as to be slightly longer than the distance between the orienting members 62.

Figure 9:
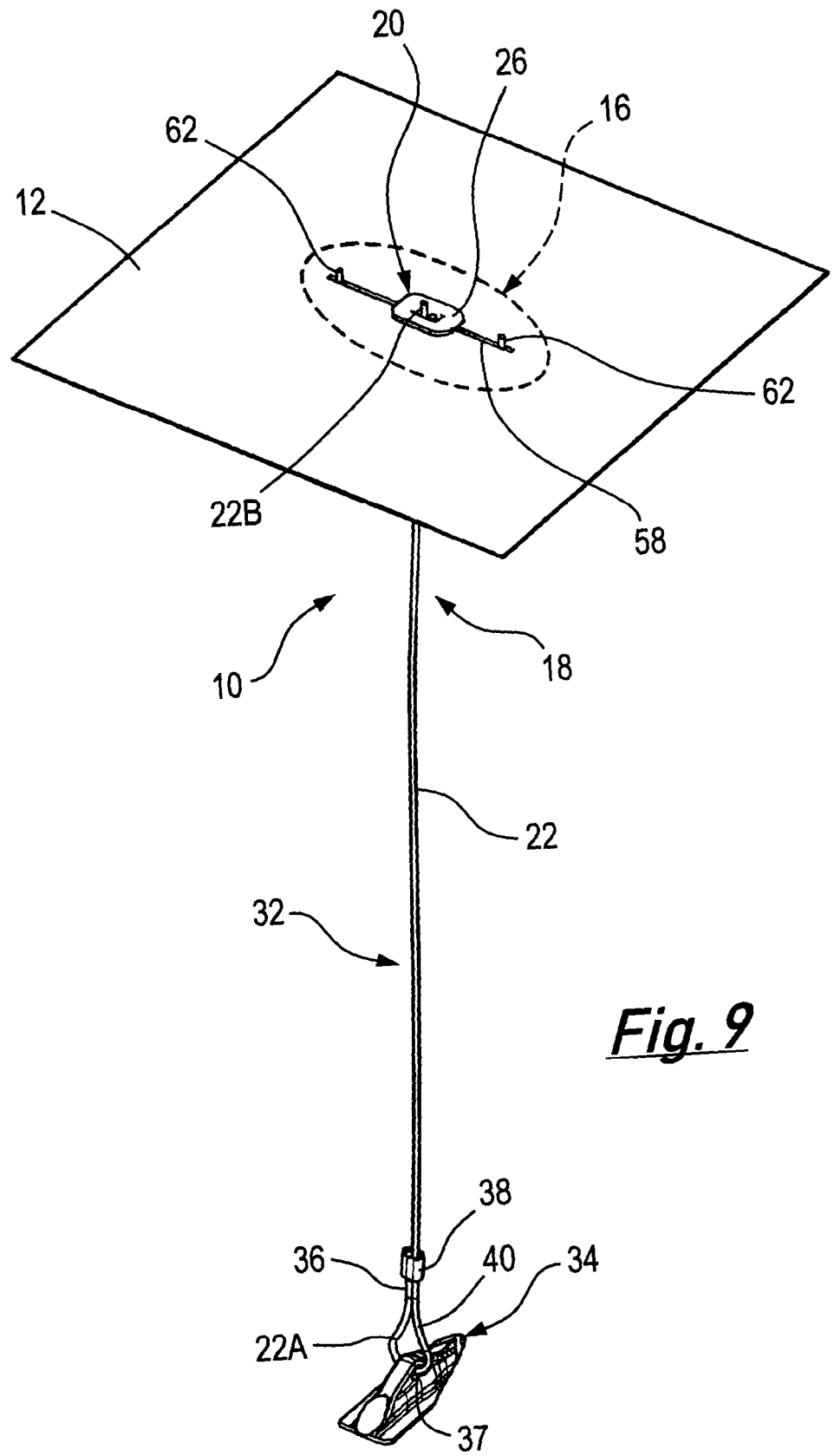
FIG. 9 shows a further step in the installation of the capping assembly.
Figure 10:
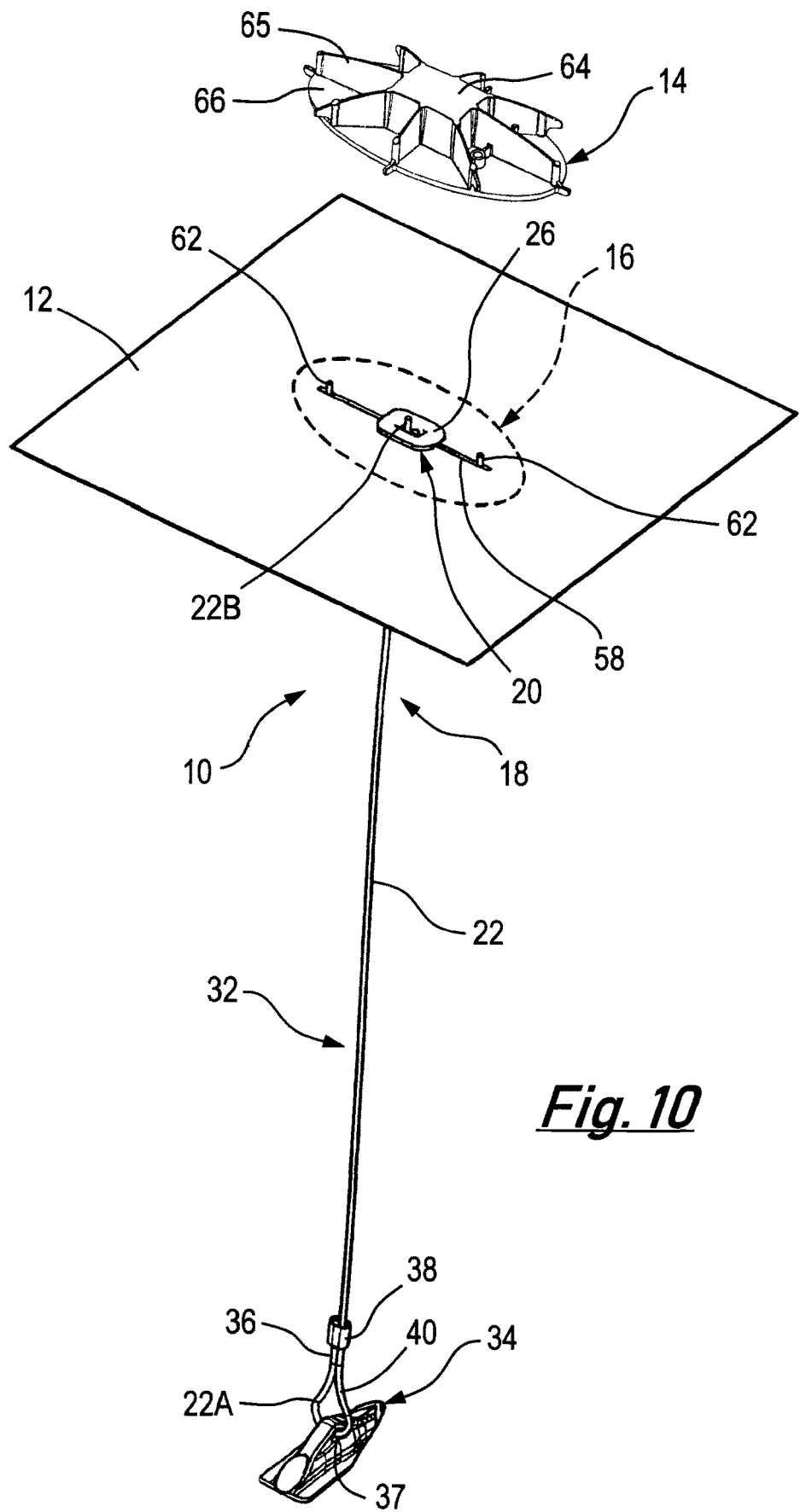
FIG. 10 shows further step in the installation of the capping assembly, in which a cap is about to be disposed on the covering membrane.
Figure 11:
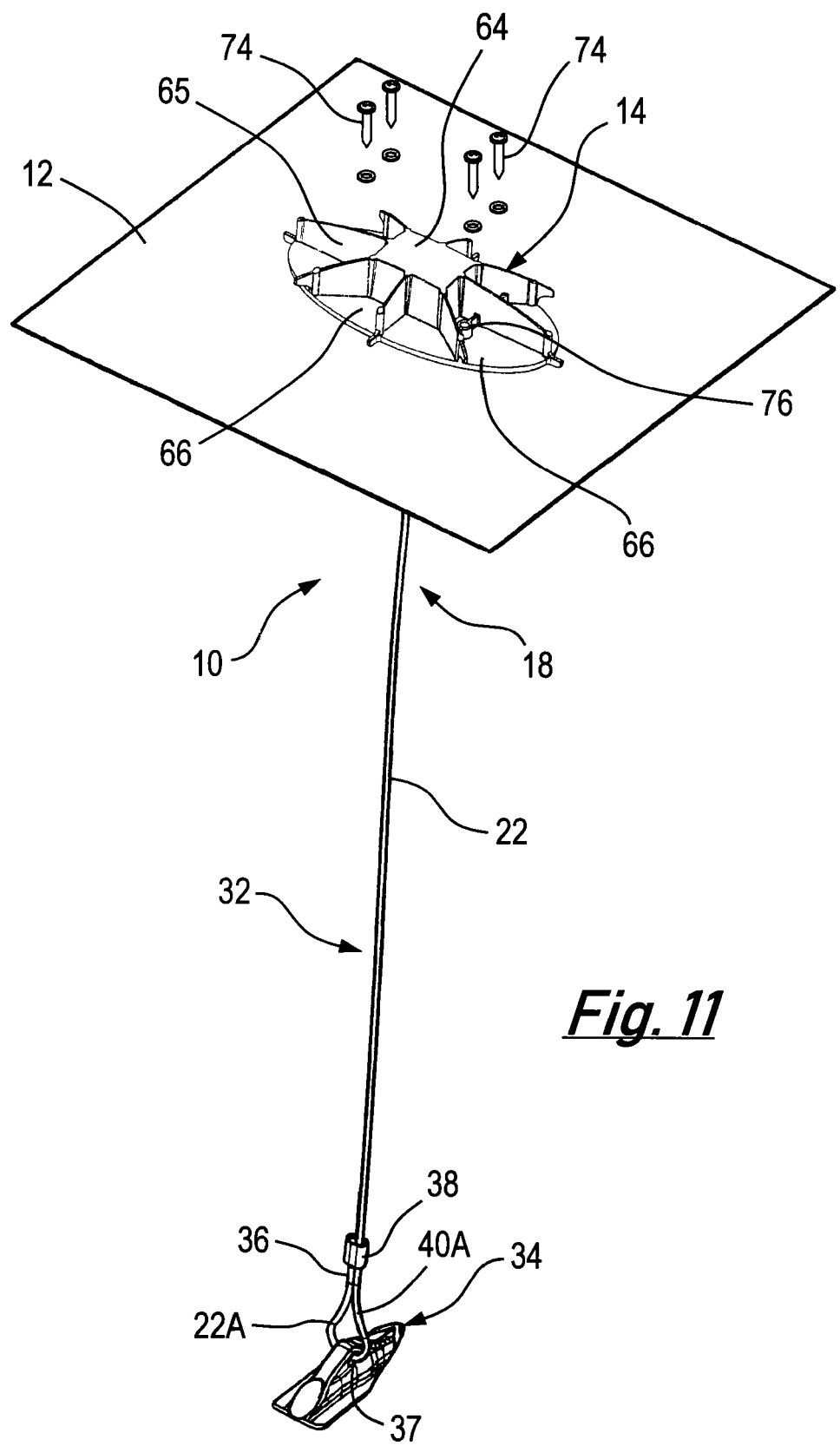
FIG. 11 shows further step in the installation of the capping assembly, in which a cap is disposed on the covering membrane.
Figure 12:
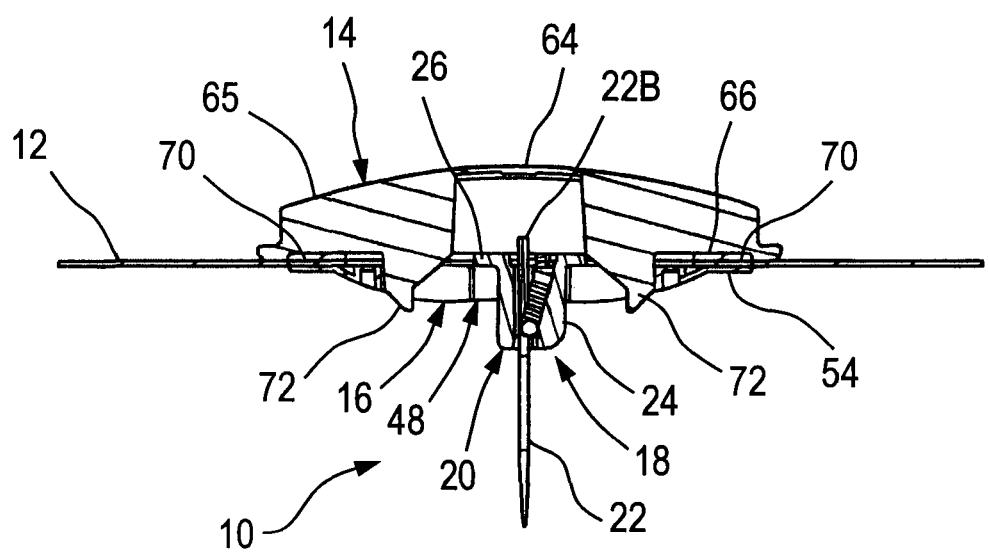
FIG. 12 is a sectional side view showing the cap attached to the insertion member.

The orienting members 62 are spaced from each other by a distance that will allow them to extend through the slit 58. The orienting members 62 can then be pulled in opposite directions, thereby rotating the insertion member 16 to the desired orientation, namely a sealing position, in which the length dimension L of the insertion member 16 extends parallel to the slit 58. The broken line in FIGS. 7, 9 and 10 show the orientation of the insertion member 16 in the sealing position.

When the insertion member 16 has been oriented to the sealing position, the tethering member 22 is pulled through the gripping device 20 to tighten the gripping device 20 against the insertion member 16, thereby securing the insertion member 16 to the anchor and to the ground. The orienting members 62 and the tethering member 22 above the covering membrane 12 can then be removed by cutting, as shown in FIG. 9. This removal of the tethering member 22 and the orienting members 62 allows the cap 14 to be arranged over the covering membrane 12 and attached to the insertion member 16.

Figure 13:
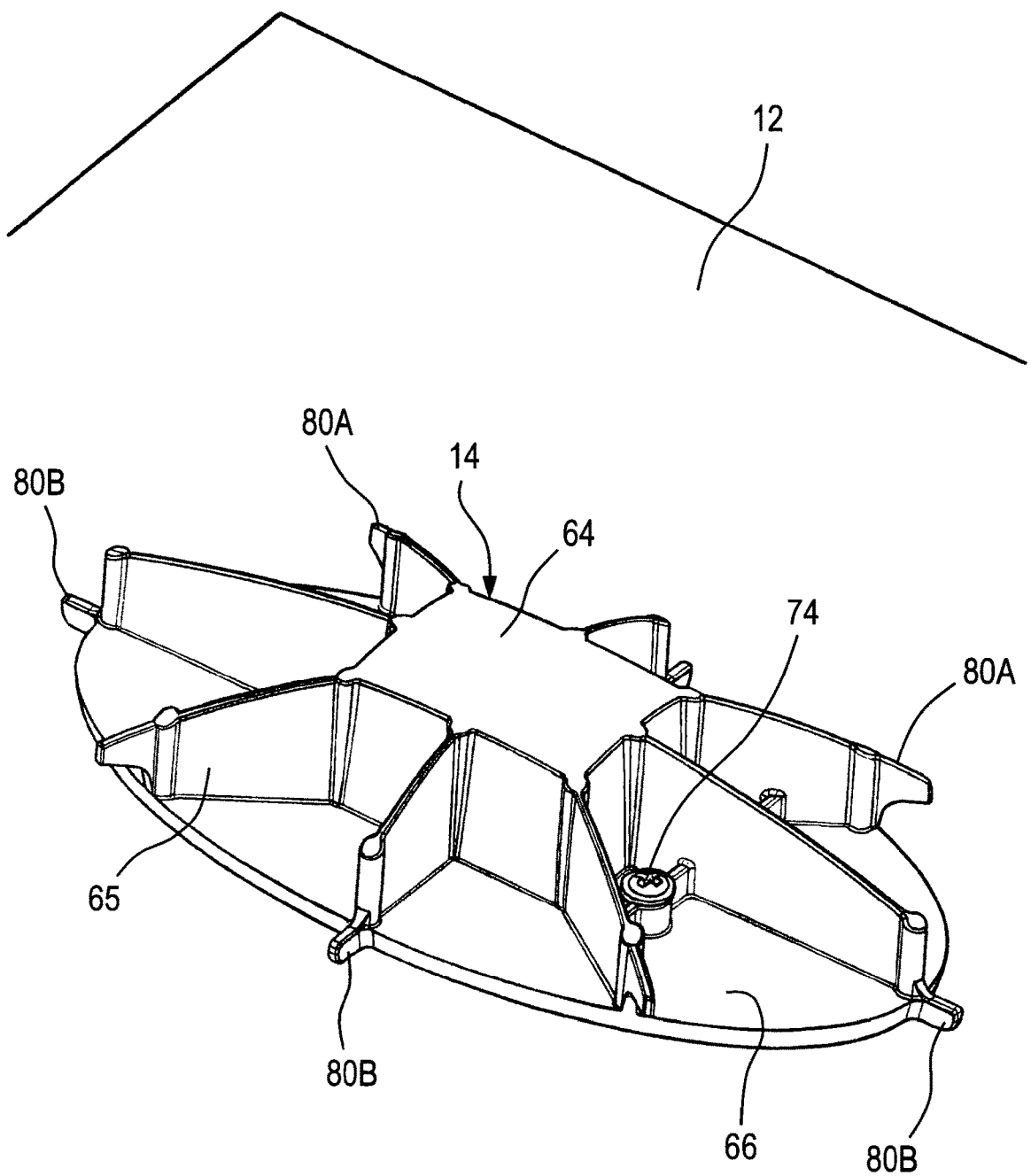
FIG. 13 is a top perspective view of the cap.
Figure 14:
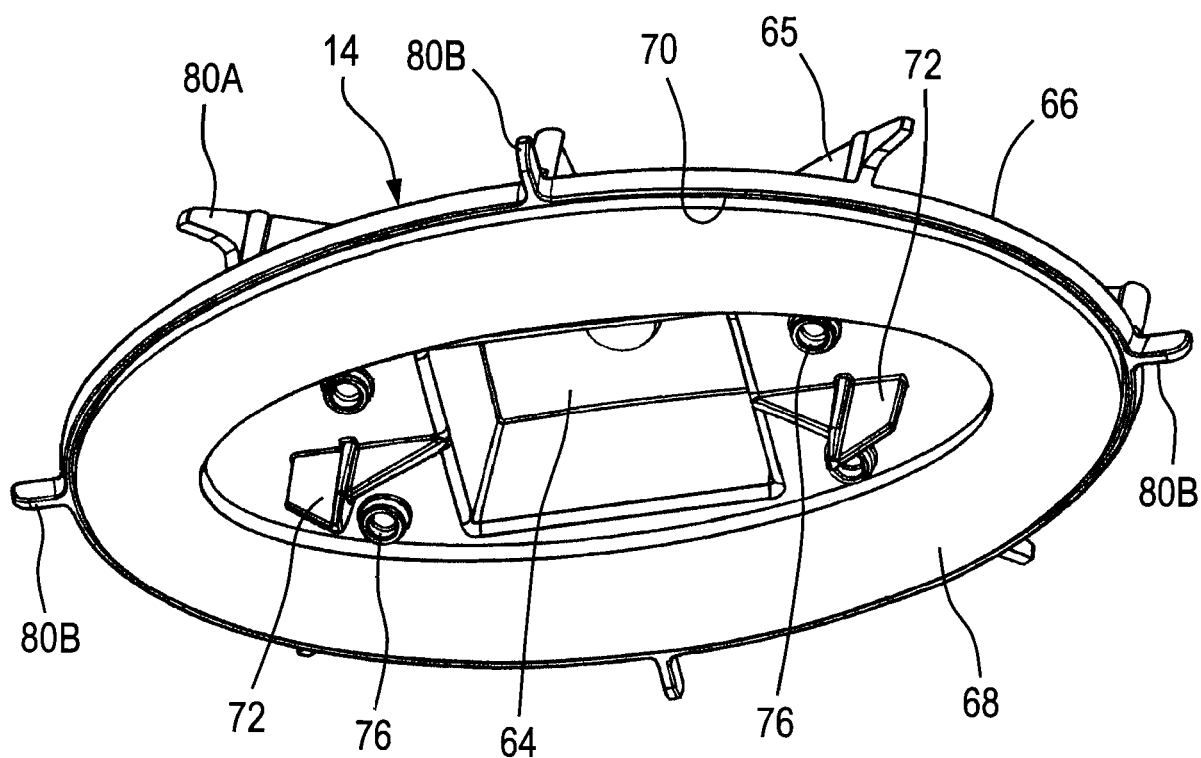
FIG. 14 is a bottom perspective view of the cap.

A top perspective view of the cap 14 is shown in FIG. 13, and a bottom perspective view is shown in FIG. 14. The cap 14 has an oval shape that corresponds to the shape of the insertion member 16. The cap 14 comprises a central portion 64 having a raised configuration, and also an outer portion 66 extending around the central portion 64. Strengthening ribs 65 extend from the central portion 64 across the outer portion 66.

The capping assembly 10 comprises a sealing portion in the form of a sealing member 68. The sealing member 68 is formed of a suitable resilient foam material to allow it to engage and seal against the covering membrane 12. The outer portion 66 has a lower surface 70 on which the sealing member 68 is provided to seal around the slit 58 in the covering membrane 12.

In order to attach the cap 14 to the insertion member 16, the cap 14 is disposed on the covering membrane 12 in alignment with the insertion member 16. The alignment is such that the outer portion 66 of the cap 14 is aligned with the peripheral portion 54 of the insertion member 16. The sealing member 68 engage and seal against the covering membrane 12.

The cap 14 includes cooperating members 72 which extend through the covering membrane 12. When the cap 14 is brought into engagement with the covering membrane 12, the cooperating members 72 are pushed through the slit 58 in the covering membrane 12. The elongate aperture 44 defined by the insertion member 16 receives the cooperating members 72.

The cooperating members 72 have edges that engage the edges of the elongate aperture 44 to cooperate therewith. Thus, the cap 14 is located on the insertion member 16, and is held on the covering membrane 12 by the interaction between the cooperating members 72 and the edge of the aperture 44.

The capping assembly 10 further includes fasteners 74, such as screws, that can extend through the covering membrane 12 and through suitable holes 76 in the cap 14 to be received by holes 78 in the insertion member 16. Thus, the cap 14 and the insertion member 16 can be tightly fastened to each other, thereby clamping the covering membrane 12 between the insertion member 16 and the cap 14.

Upper and lower hook formations 80A, 80B are provided around the edge of the central portion 64 to hold an elongate flexible member (not shown) wrapped around the cap 14. The elongate flexible member extends around the cap 14 to an article (not shown) to attach the article to the cap 14. The article may be a reinforcing block or a sand bag disposed on the covering membrane 12 to reinforce it. Alternatively, the article may be another capping assembly 10.

Various modifications can be made without departing from the scope of the invention. For example, the securing arrangement 18 has been described above as being in the form of an aperture 44 that can hold the gripping device 20. Alternatively, the securing arrangement 18 may comprise a gripping device wherein the gripping device is fixedly attached either to the insertion member 16 or to the cap 14.

FIGS. 15 to 21 show another capping arrangement, generally designated 1010, for use in securing a covering membrane 1100 onto landfill on a landfill site. The capping arrangement 1010 comprises a cap 1011 and a lid 1012 which can be mounted on the cap 1011. The capping arrangement 1010 also comprises a sealing portion 1014 to seal the cap 1011 against the covering membrane 1100.

The capping arrangement 1010 further includes a tethering assembly 1016 for securing the cap 1011 on the covering membrane 1100. The tethering assembly 1016 comprises an elongate tethering member 1018, a gripping device 1020 for gripping the tethering member 1018, and a ground anchor 1022 which can be anchored in the ground. The tethering member 1018 is in the form of a wire, cable, wire rope or the like.

The cap 1011 is formed of a resiliently deformable material thereby allowing the cap 1011 to hold the lid 1012 thereon and to conform to the shape of the covering membrane 1100. The cap 1011 comprises a raised central portion 1024 and an outer portion 1026 extending annularly around the central portion 1024.

The central portion 1024 constitutes a securing formation which enables the cap 1011 to be secured to the ground. In the embodiment shown, the central portion 1024 defines an aperture 1024A through the cap 1011.

The central portion 1024 has an annular upwardly directed support face 1025 extending around the aperture 1024A. The gripping device 1020 extends through the aperture 1024A and is supported on the support face 1025 of the central portion 1024, as explained in more detail below.

The cap 1011 defines an annular blind slot 1027 (see FIGS. 16 and 18) extending around the central portion 1024, the slot 1027 being defined between the outer portion 1026 and the central portion 1024. The lid 1012 has an annular wall portion 1028 and a top portion 1030.

A lower edge region 1032 of the wall portion 1028 is received in the slot 1027, and the top portion 1030 extends over the aperture 1024A. The lower edge region 1032 of the wall portion 1028 is inserted into the slot 1027, and is held on the cap 1011 by the resilient deformation of the cap 1011 which grips the wall portion 1028.

The cap 1011 has a lower face 1034 defining a recess 1036 which provides a dished configuration to the cap 1011. The dished configuration of the cap 1011 allows the resiliently deformable cap 1011 to seal against the covering membrane 1100, and to conform to the shape of the covering membrane 1100. A rim portion 1040 extends axially beyond the central portion 1024 to define the recess 1036.

The lower face 1034 also defines an annular socket 1038 extending around the recess 1036 at the rim portion 1040. The socket 1038 holds the sealing portion 1014. The sealing portion 1014 comprises an annular sealing member 1042 to engage the covering membrane 1100, and further includes an annular holding element 1044 which can be pushed into the socket 1038 so that the sealing portion 1014 is held on the cap 1011 by the socket 1038.

Figure 18:
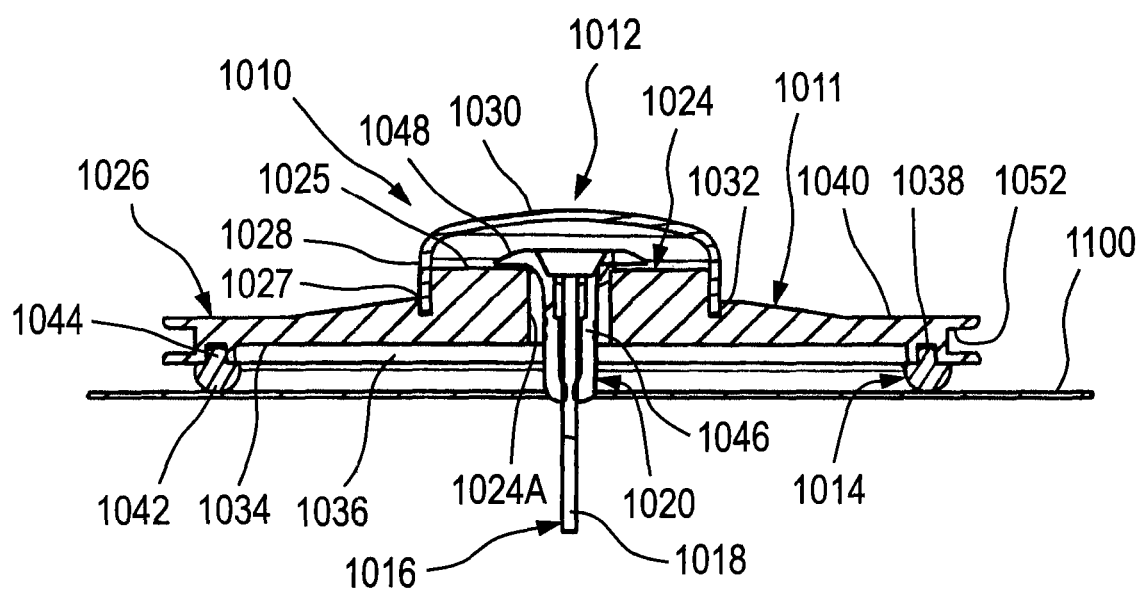
FIG. 18 is a sectional side view of the capping arrangement shown in FIG. 15 in use on a covering.
Figure 19:
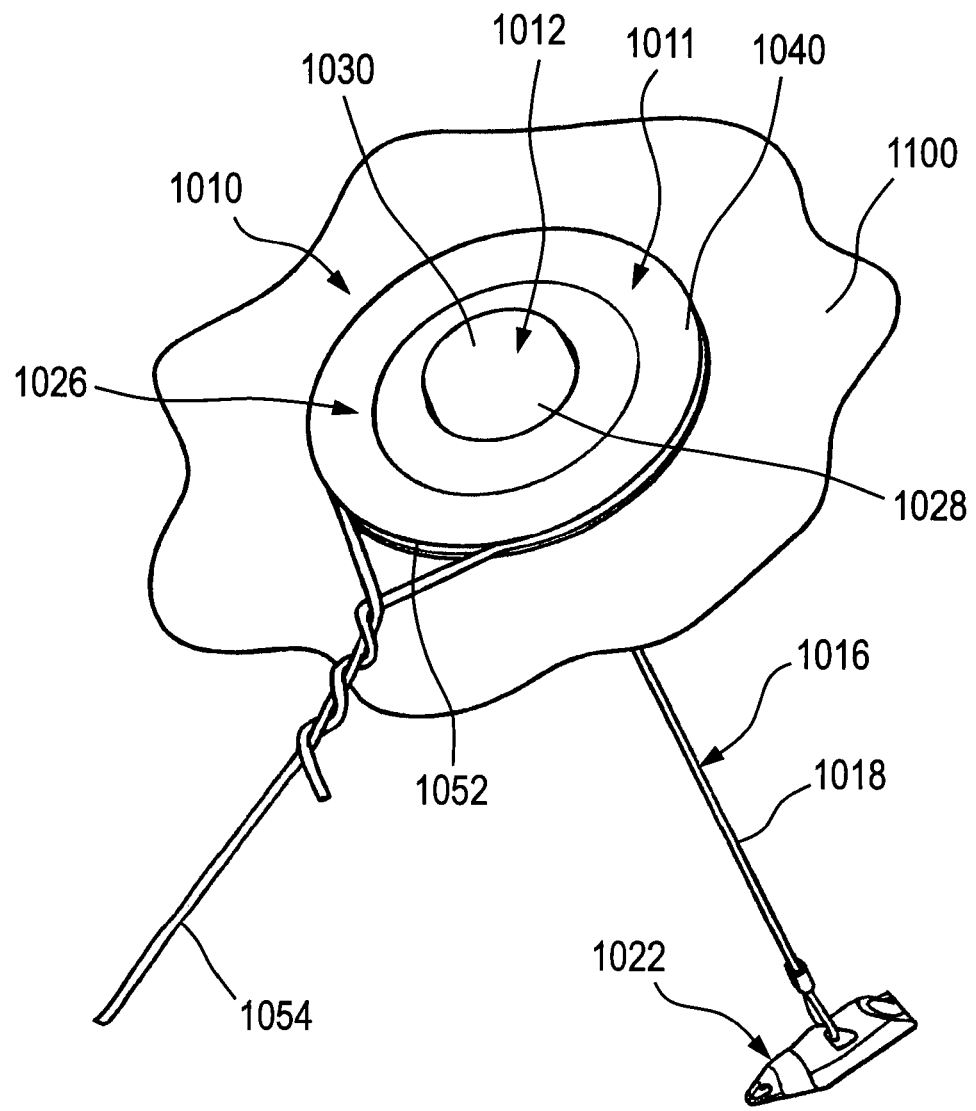
FIG. 19 is a further perspective view of the capping arrangement shown in FIG. 15 attached to an elongate element.

Reference is now made to FIG. 18, which shows the gripping device 1020 mounted on the cap 1011. The gripping device 1020 may be, for example, a securing device as shown and described in published patent application No. GB2516533.

As shown in FIG. 18, the gripping device 1020 comprises a body 1046 and gripping components disposed within the body 1046. The gripping device 1020 further includes an outwardly extending flange 1048 on the body 1046.

In use, the body 1046 is inserted through the aperture 1024A in the raised central portion 1024 of the cap 1011. The outwardly extending flange 1048 engages the support face 1025, thereby supporting the gripping device 1020.

The ground anchor 1022 may be as described in GB2514004. In use of the embodiment of the present invention described herein, the tethering member 1018 is attached to the ground anchor 1022 as shown. The ground anchor 1022 is then driven into the landfill through a hole 1050 in the covering membrane 1100. The ground anchor 1022 is driven through the landfill into the ground and is anchored therein.

When the ground anchor 1022 is anchored in the ground, the tethering member 1018 can be threaded through the body 1046 of the gripping device 1020, and pulled tight. As a result, the tethering member 1018 is gripped in the gripping device 1020.

By pulling the tethering member 1018 tight within the gripping device 1020, the cap 1011 is pulled against the covering membrane 1100. This causes the cap 1011 to deform so that it conforms to the shape of the covering membrane 1100. This causes the sealing portion 1014 to seal against the covering membrane 1100.

The dished configuration of the cap 1011 causes the tension in the tethering member 1018 to be transmitted through the cap 1011 to the covering membrane 1100 via the rim portion 1040. Thus, the tethering member 1018 pulls the sealing portion 1014 on the rim portion 1040 into sealing engagement with the covering membrane 1100.

The portion of the tethering member 1018 protruding upwardly from the gripping device 1020 is then cut to an appropriate length to allow the lid 1012 to be mounted on the cap 1011. The lower edge region 1032 of the wall portion 1028 is inserted into the slot 1027, thereby causing the cap 1011 to deform resiliently and seal against the lid 1012. An impervious seal is thus created to prevent or reduce escape of fumes from the landfill. Similarly, the sealing portion 1014 seals against the covering membrane 1100, preventing escape of fumes via the rim portion 1040 of the cap 11.

The rim portion 1040 of the cap 1011 defines an annular cavity 1052 extending around the cap 1011. The cavity 1052 is directed radially outwardly. A flexible elongate element, such as a webbing tape 1054, is received in the annular cavity 1052. The webbing tape 1054 extends around the cap 1011 to an article (not shown) to attach the article to the cap 1011. The article may be a reinforcing block disposed on the covering membrane 1100 to reinforce it.

There is thus described a capping arrangement 1010 for securing a covering membrane 1100 on landfill in a landfill site. The capping arrangement 1010 seals around the hole 1050 formed in the covering membrane 1100 and around the aperture 1024A in the cap 1011 without the need to provide any additional material over the capping arrangement 1010. This reduces costs and installation time.

Figure 20:
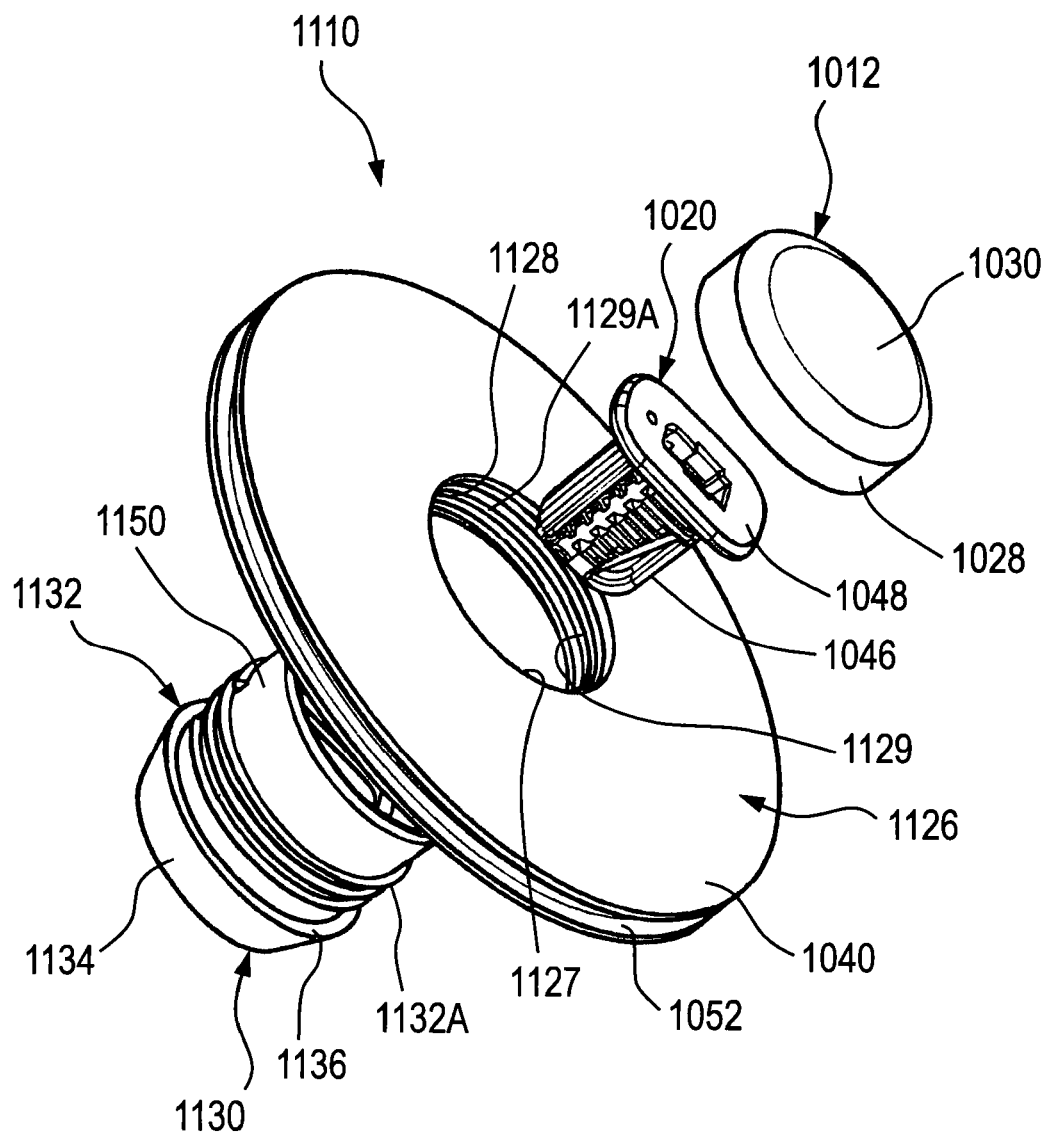
FIG. 20 is an exploded view of another capping arrangement.
Figure 21:
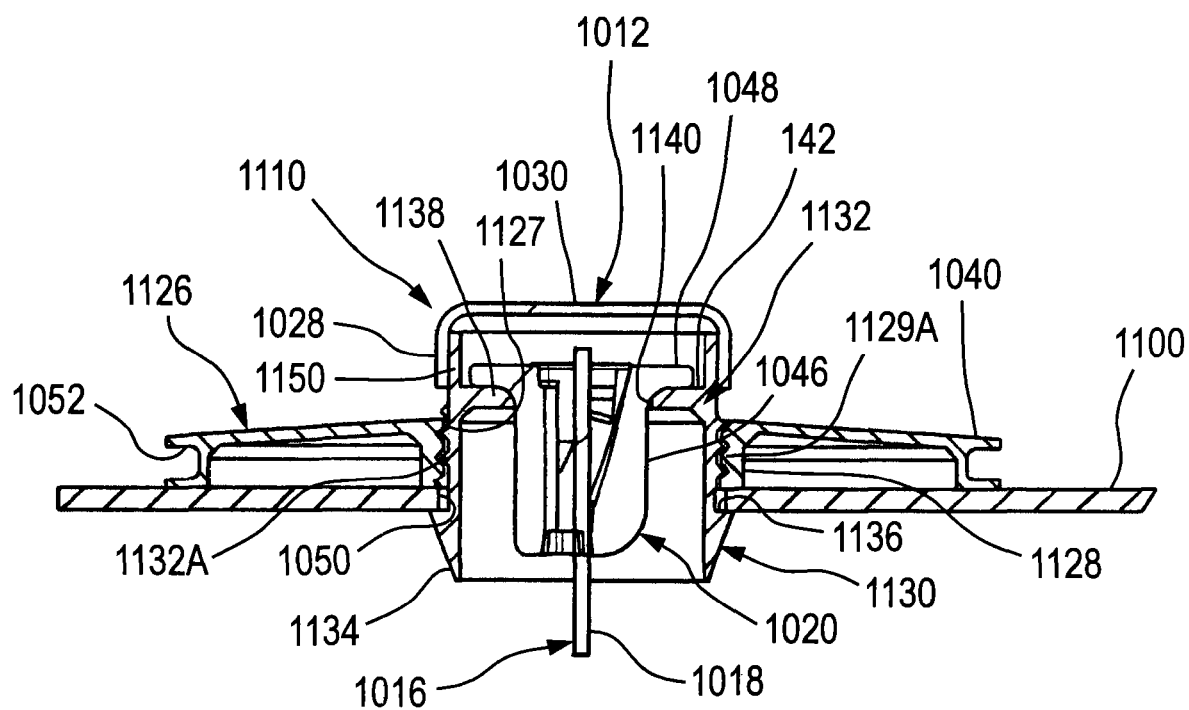
FIG. 21 is a sectional side view of the capping arrangement shown in FIG. 20.
Figure 22:
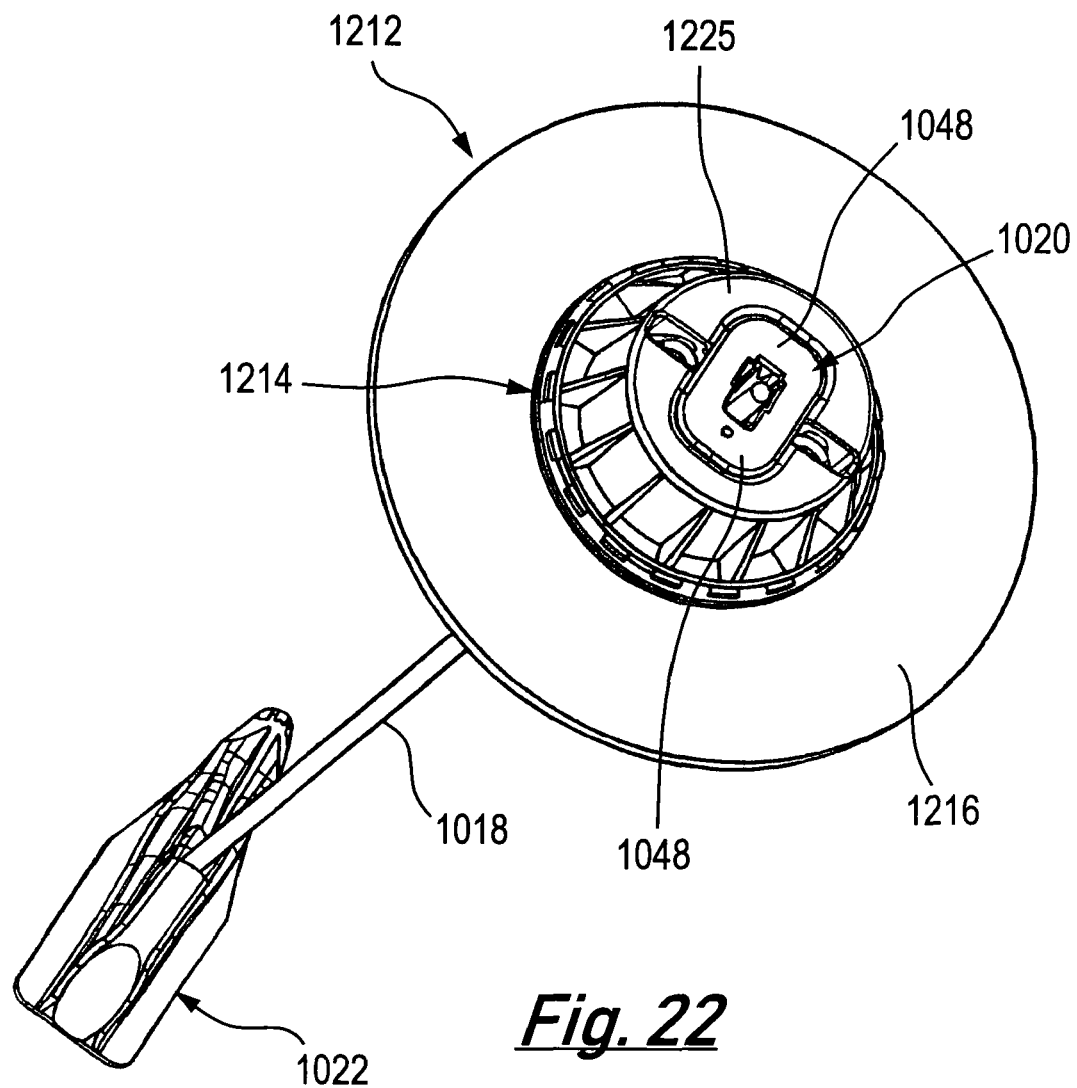
FIG. 22 is a perspective view from above of yet another capping arrangement for use on a covering.
Figure 23:
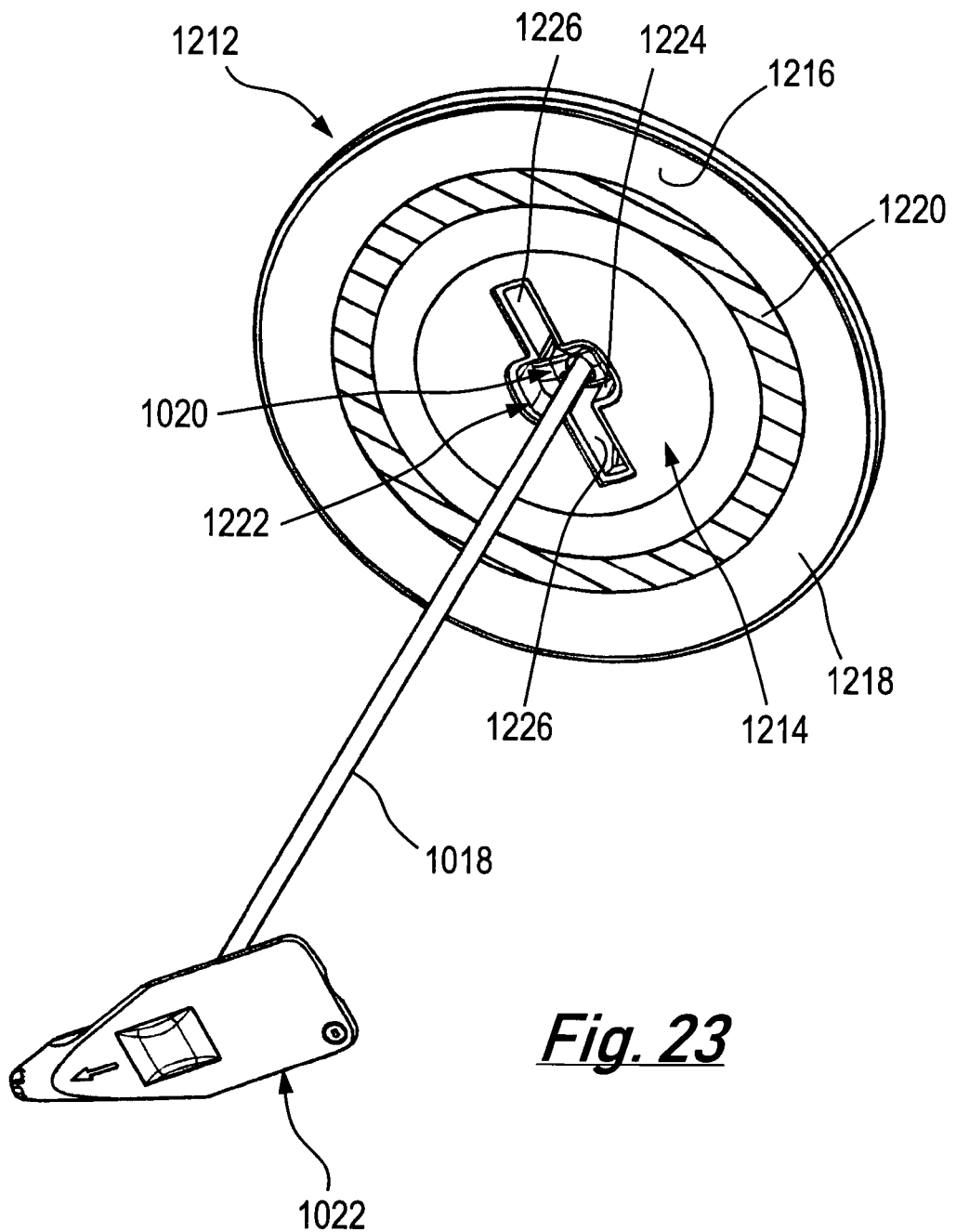
FIG. 23 is a perspective view from below of the capping arrangement shown in FIG. 22.
Figure 24:
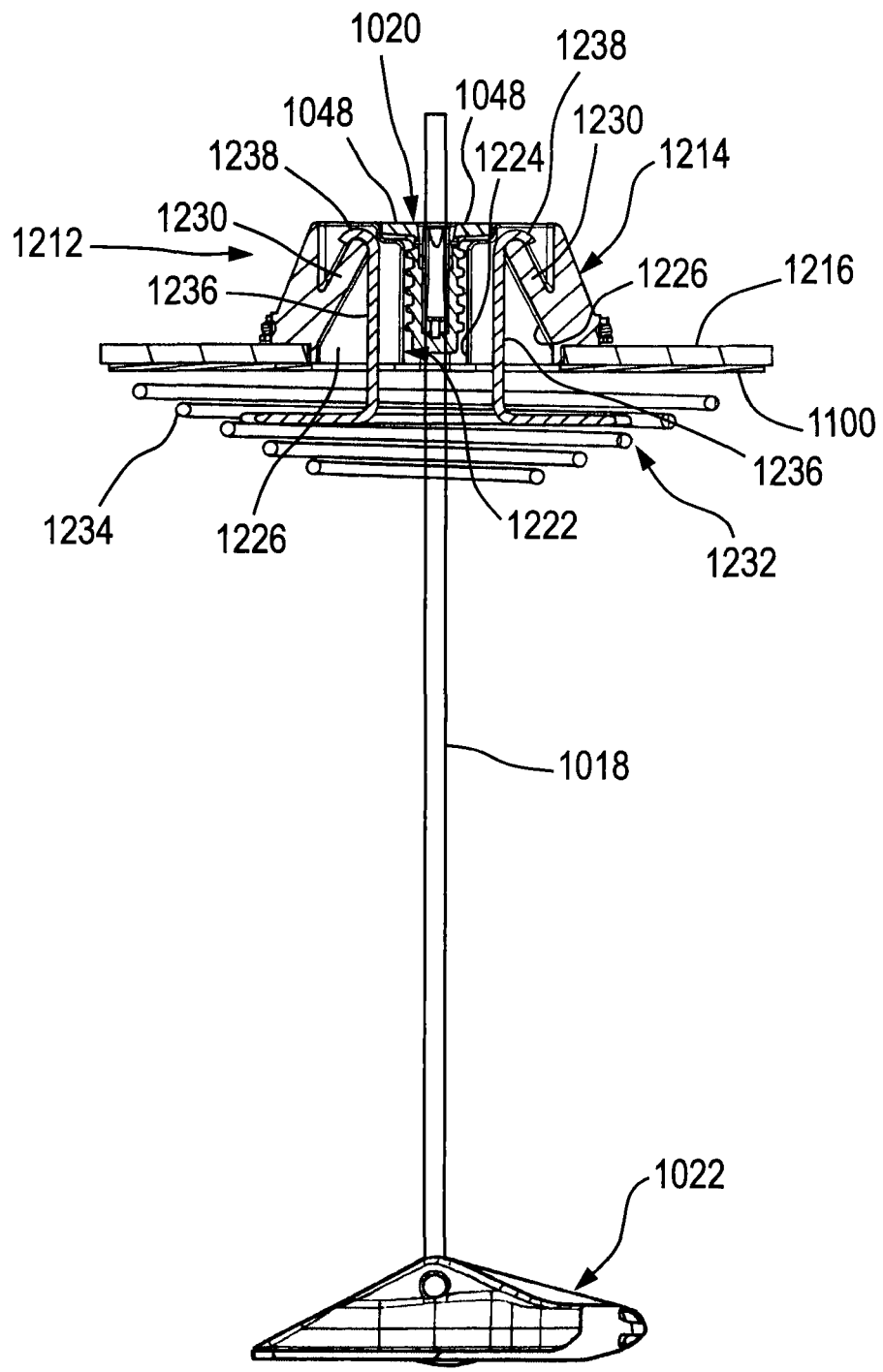
FIG. 24 is a sectional side view of the capping arrangement shown in FIG. 22.
Figure 25:
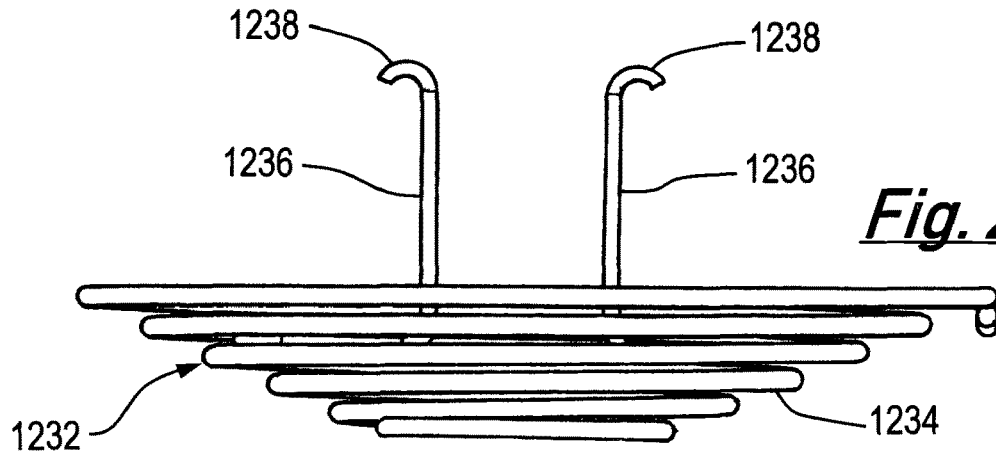
FIG. 25 shows an urging member for use in the capping arrangement shown in FIG. 22.
Figure 26:
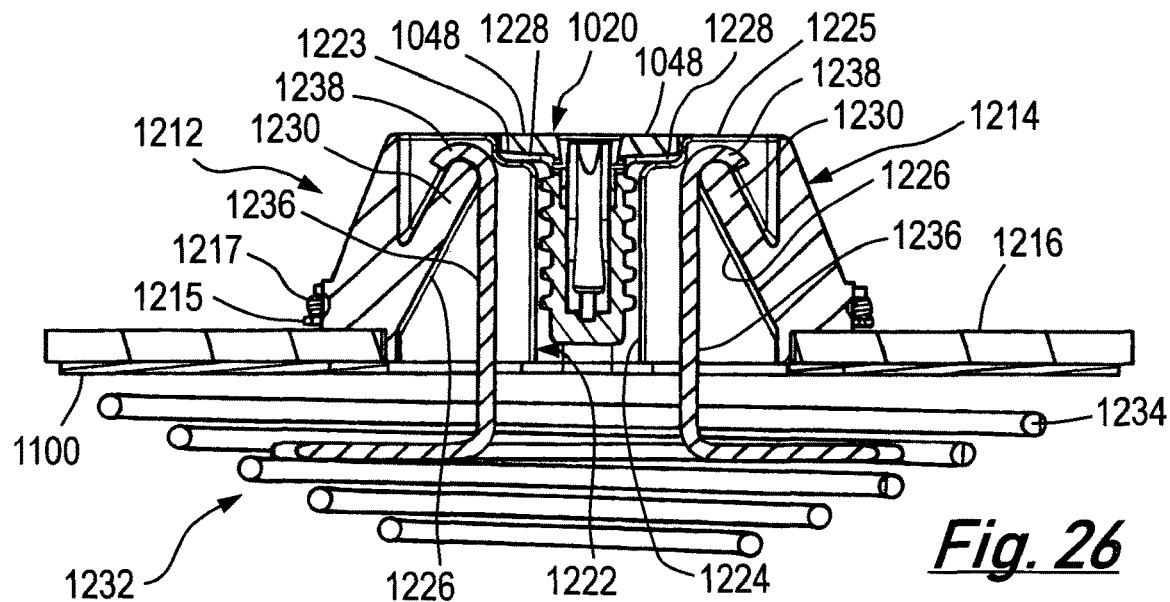
FIG. 26 is a sectional side view of a cap and the urging arrangement attached thereto, all being part of the capping arrangement shown in FIG. 22.
Figure 27:
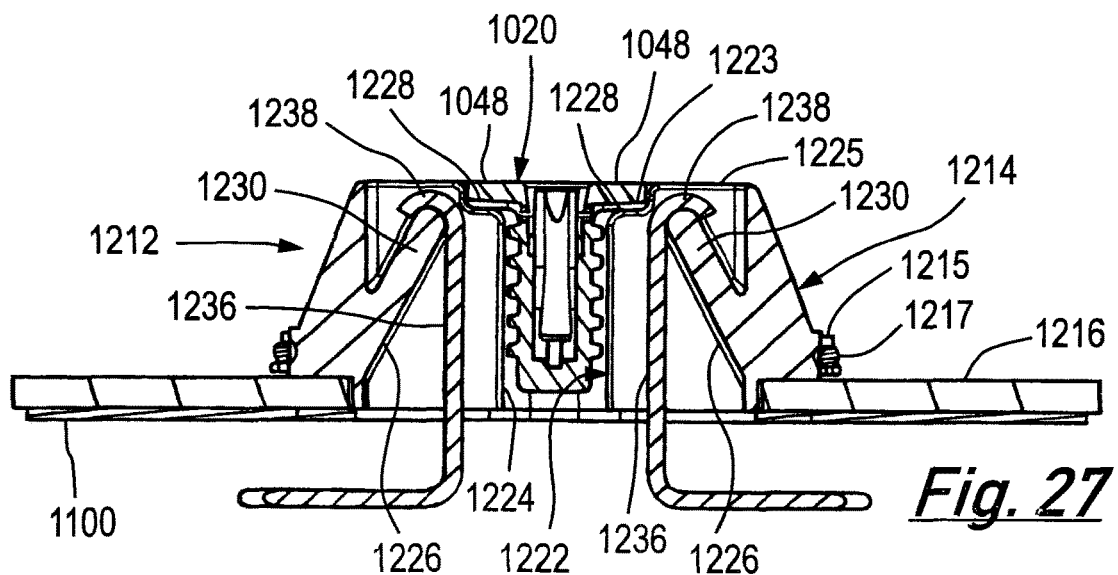
FIG. 27 is a view similar to FIG. 26, but showing the attaching members.

Various further modifications can be made without departing from the scope of the invention. Yet another capping arrangement, generally designated 1110, is shown in FIGS. 20 and 21. The capping arrangement 1110 comprises many of the features of the capping arrangement 1010 shown in FIGS. 15 to 19. These features are designated with the same reference numerals as the corresponding features shown in FIGS. 15 to 19.

The capping arrangement 1110 comprises a cap 1111 that differs from the cap 1011 in that it comprises an outer portion 1126 defining an opening 1127. A clamping member 1128 extends from the outer portion 1126. The clamping member 1128 is in the form of a cylindrical member defining a bore 1129 extending from the opening 1127. The clamping member 1128 includes internal threads 1129A.

The cap 1111 further includes an insertion member 1130, which can be received in the opening 1127. The insertion member 1130 has a cylindrical main portion 1132 having external threads 1132A. The main portion 1132 can be received in the cylindrical bore to allow the insertion member 1130 to be screwed into the opening 1127 in the outer portion 1126.

The insertion member 1130 further includes a radially extending frustoconical projection 1134 on the main portion 1132. The frustoconical projection 1134 is in the form of a leading section. The insertion member 1130 is inserted into a hole 1050 in the covering membrane 1100 for reasons explained below When the insertion member 1130 is inserted into the hole 1050, the frustoconical projection 1134 is inserted first. The frustoconical shape of the projection 1134 facilitates the insertion of the insertion member 1130 into the hole 1050.

The frustoconical projection 1134 constitutes a fastening element to fasten the covering membrane to the cap 1111. The fastening element is in the form of a radially outwardly extending engaging surface 1136.

The hole 1050 is made slightly smaller than the frustoconical projection 1134. As a result, on insertion of the frustoconical projection 1134 into the hole 1050, the region of the covering membrane surrounding the hole 1050 slides along the frustoconical projection 1134, and then springs over the frustoconical projection 1134 to engage the engaging surface 1136.

The outer portion 1126 can then be screwed onto the insertion member 1130 and tightened onto the region of the covering membrane 1100 on the engaging surface 1136. This clamps the covering membrane 1100 between the engaging surface 1136 and the clamping member 1128, thereby sealing the covering membrane 1100 to the cap 1111.

The main portion 1132 further includes a radially inwardly extending support member 1138 defining an aperture 1140 to receive the gripping device 1020. The support member 1138 provides a support face 142 to support the gripping device 1020.

An annular lid contact portion 1150 extends from the support member 1138. The lid 1012 receives the annular lid contact portion 1150 when the lid 1012 is mounted on the cap 1111.

The gripping device 1020 grips the tethering member 1018, which allows the tethering member 1018 to be tightened, thereby pulling the capping arrangement 1110 tightly against the covering membrane 1100.

Referring to FIGS. 22 to 29, there is shown yet another capping arrangement, generally designated 1210, which comprises many of the features of the capping arrangement 1110 described above. These features have been designated with the same reference numerals in FIGS. 22 to 25 as the corresponding features in FIGS. 15 to 19.

The capping arrangement 1210 comprises a cap 1212 having a central portion 1214 and an outer portion 1216 extending annularly around the central portion 1214. The outer portion 1216 is in the form of an annular disc.

The central portion 1214 may be formed integrally with the outer portion 1216. Alternatively, the central portion 1214 may be formed separately from the outer portion 1216 and attached thereto using thread formations similar to those describe above with reference to the capping arrangement 1210 shown in FIGS. 20 and 21, or by other suitable techniques that would be understood by those skilled in the art.

The cap 1212 has a lower surface 1218 on which a mastic material 1220 is applied to the outer portion 1216. In use, the mastic material 1220 adheres the cap 1212 to the covering membrane 1100 and provides a seal, so that the cap 1212 is sealed against the covering membrane 1100.

The central portion 1214 of the cap 1212 defines an aperture 1222 therethrough, having the same function as the apertures 1024A and 1140 discussed above. The central portion 1214 also defines a recess 1223 in the upper surface 1225 of the central portion 1214, adjacent the aperture 1222. The recess 1223 provides support faces 1228 to engage and support the outwardly extending flanges 1048 on the gripping device 1020, thereby holding the gripping device 1020 in the central portion 1214.

In the same manner as described above, the tethering member 1018 is gripped by the gripping device 1020 and extends to the ground anchor 1022, the ground anchor 1022 having been driven into the landfill, or into the ground beneath the landfill.

The aperture 1222 has a main aperture region 1224, in which the gripping device 1020 is received, and a pair of opposed subsidiary aperture regions 1226 extending from the main aperture region 1224. A pair of opposed cooperating members 1230, in the form of fingers, are provided within the subsidiary aperture regions 1226. The cooperating members 1230 slope upwardly towards each other. The purpose of the cooperating members 1230 is described below.

The capping arrangement 1210 further includes an urging arrangement 1232 (see FIG. 24) comprising a resilient member 1234 in the form of a compression spring. The urging arrangement 1232 also includes two attaching members 1236 extending upwardly from an internal region of the resilient member 1234.

The attaching members 1236 are elongate, having free, upper ends. A respective hook portion 1238 is provided on each free end of the attaching member 1236. The hook portions 1238 can hook onto the upper ends of the cooperating members 1230 in the subsidiary aperture regions 1226, thereby attaching the urging arrangement 1232 to the cap 1212, as explained in more detail below.

Figure 28:
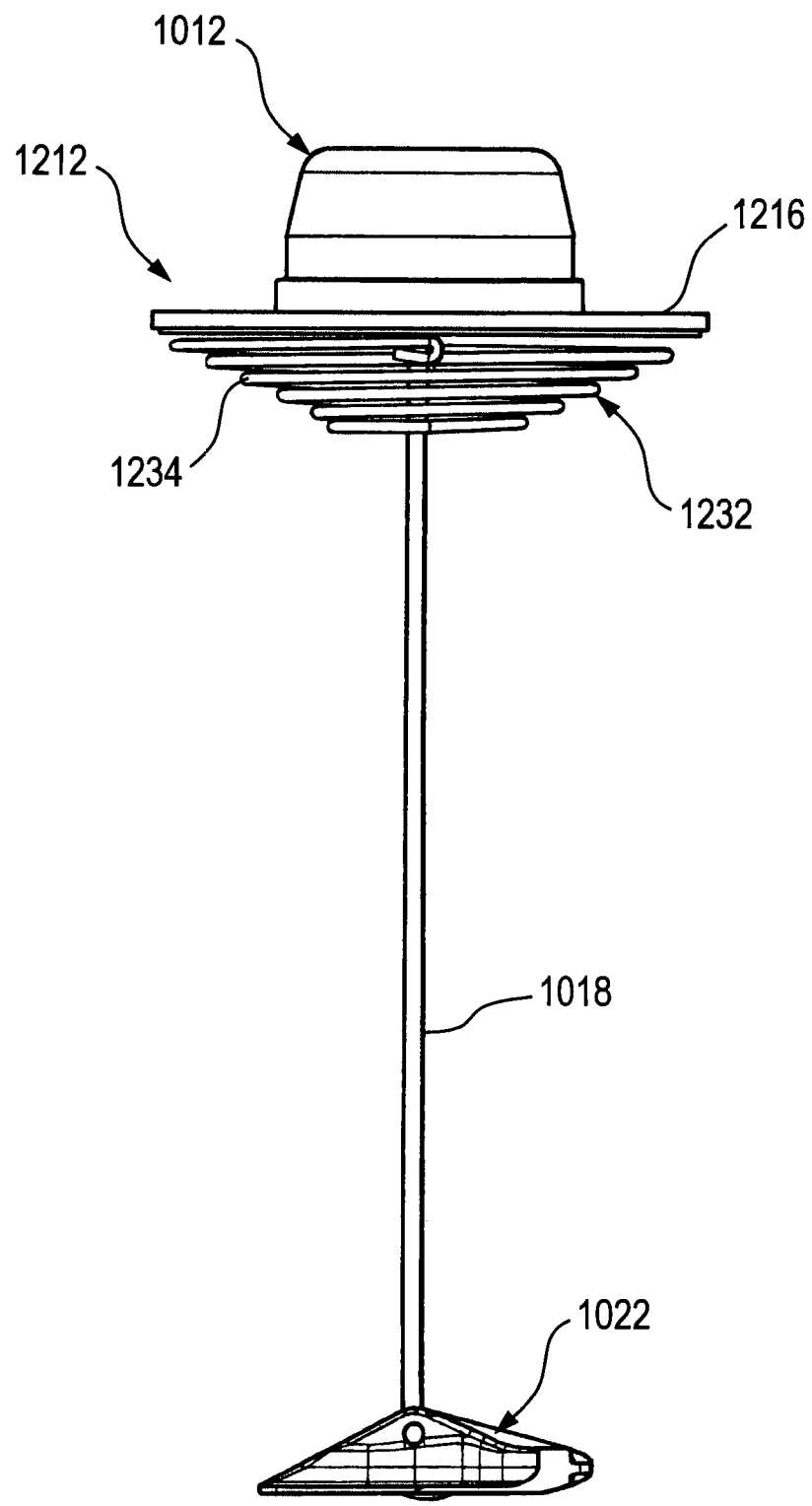
FIG. 28 is a side view of the capping arrangement shown in FIG. 22, with a lid on the cap.
Figure 29:
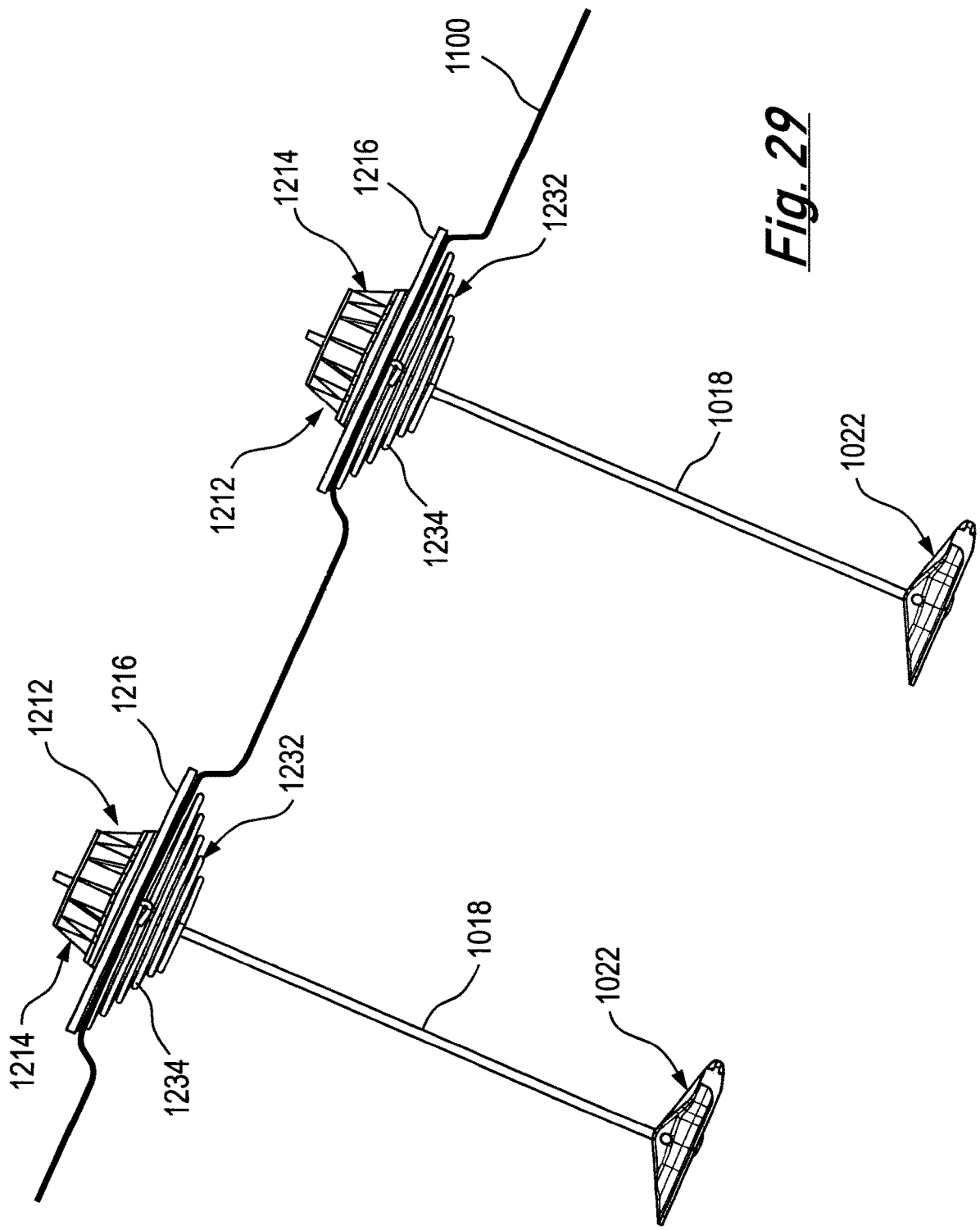
FIG. 29 is a schematic view of two capping arrangements in use.

FIG. 28 shows the capping arrangement 1210 in which the lid 1012 is disposed on the central portion 1214 of the cap 1212. The cap 1212 has a lid contact portion 1215 adjacent the outer portion 1216. As can be seen from FIGS. 24 and 26, the lid contact portion 1215 is closer to the outer portion 1216 than the support faces 1228. The lid contact portion 1215 has a seal member 1217, such as an 'O' ring seal to engage the lid, thereby preventing the escape of fumes.

In use, a hole is made in the covering membrane 1100, and the ground anchor 1022 drive into the ground a distance such that the a suitable length of the tethering member 1018 protrudes out of the hole. The urging arrangement 1232 is then passed through the hole in the covering membrane 1100 so that the tethering member 1018 extends through the middle of the urging arrangement 1232.

The urging arrangement 1232 is arranged so that the attaching members 1236 extend through the hole. The cap 1212 is then arranged over the hole so that the attaching members 1236 are received in the subsidiary aperture regions 1226. The hook portions 1238 are hooked over the ends of the cooperating members 1230 in the subsidiary aperture regions 1226, thereby attaching the urging arrangement 1232 to the cap 1212. Thus, the covering membrane 1100 is secured between the urging arrangement 1232 and the cap 1212.

The end of the tethering member protruding from the hole is then fed through the gripping device 1020, and pulled tight, so that the gripping device is pulled into tight engagement with the support faces. This pulls the cap 1212 against the resilient member 1234, and pushes the urging arrangement 1232 into the landfill. The effect is to compress the resilient member 1234 so that it presses the covering membrane 1100 against the cap 1212, thereby clamping the covering membrane 1100 between the cap 1212 and the resilient member 1234.

Figure 15:
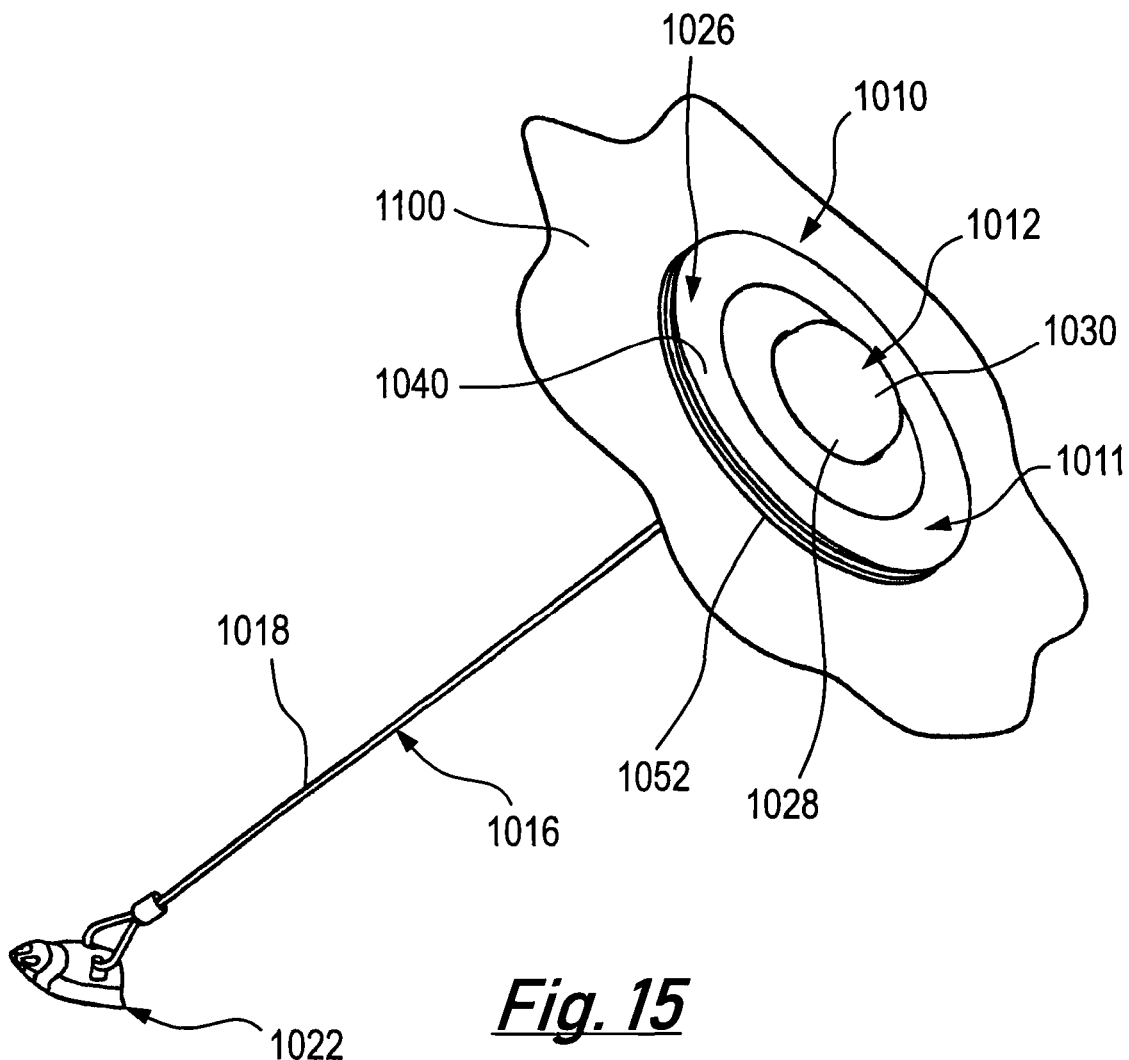
FIG. 15 is a perspective view of a further capping arrangement in use on a covering.
Figure 16:
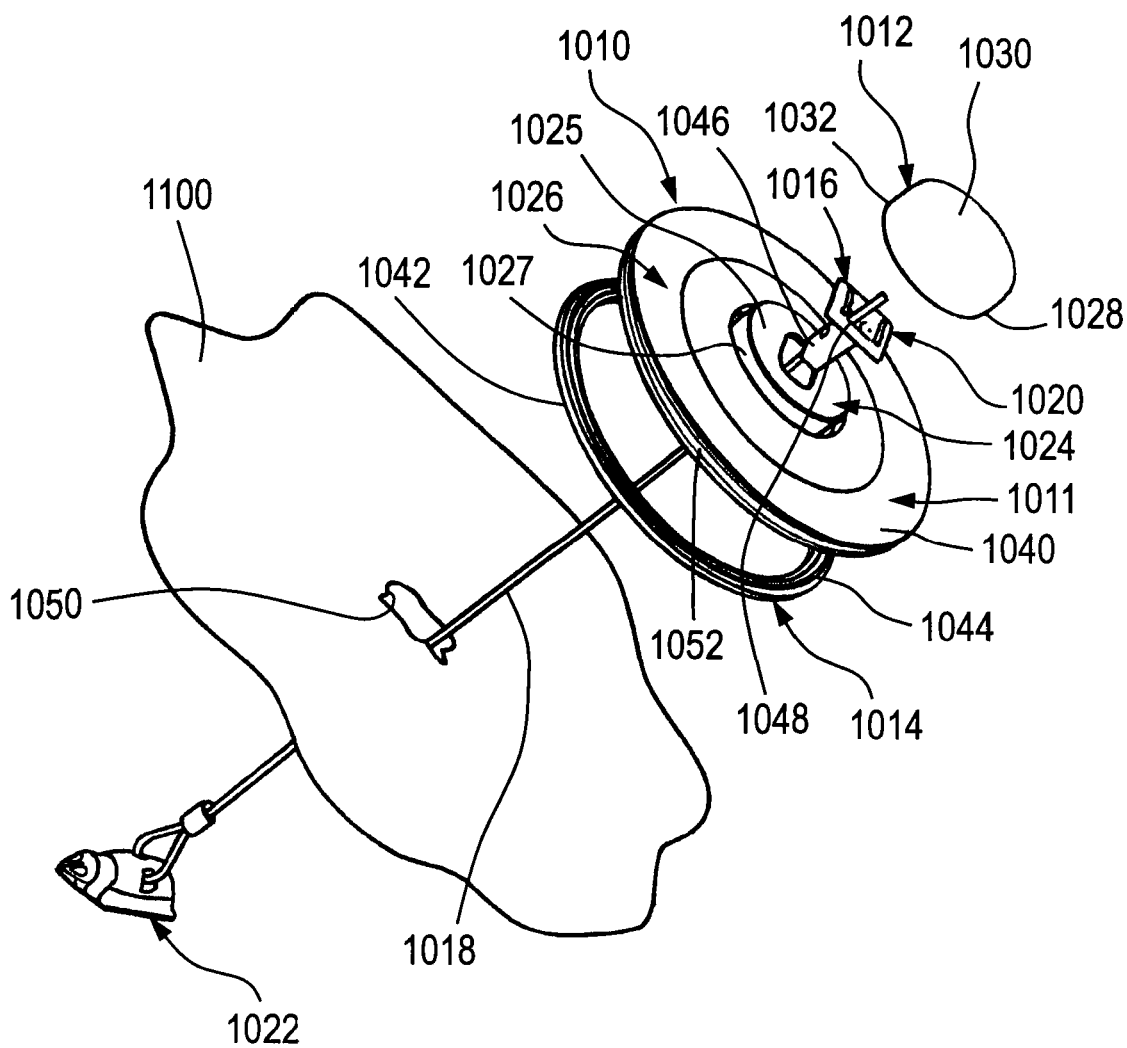
FIG. 16 is an exploded perspective view of the capping arrangement shown in FIG. 15.
Figure 17:
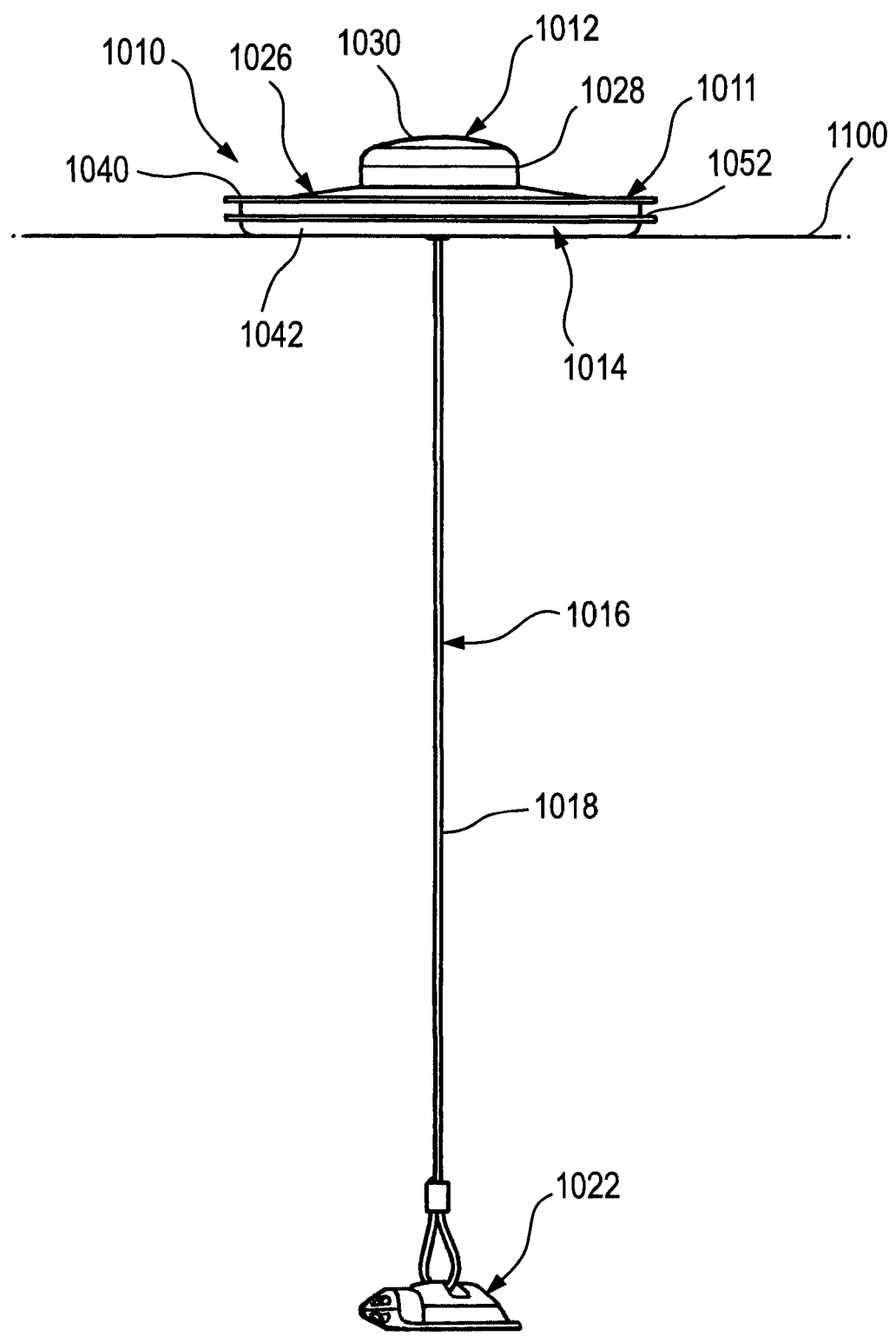
FIG. 17 is a side view of the capping arrangement shown in FIG. 15 in use on a covering.

FIG. 15 shows schematically two capping arrangements 1210 in use on a landfill. Each of the capping arrangements 1210 shown in FIG. 29 has the covering membrane clamped between the resilient members 1234 and the cap 1212.

The invention claimed is:

1. A capping assembly for mounting on a covering, the capping assembly comprising;
   a cap which can be disposed on the covering;
   a securing arrangement to enable the capping assembly to be secured on the covering; and
   an insertion member for insertion through the covering, wherein the cap can be attached to the insertion member;
   wherein the securing arrangement comprises a securing device and a holding formation to hold the securing device, the holding formation being provided on the insertion member;
   wherein the cap and the insertion member together constitute a clamping assembly for clamping the covering, the securing device being held by the clamping assembly, and the securing arrangement includes a tethering assembly to secure the capping assembly to the ground, the tethering assembly comprising an elongate tethering member secured to the securing device; and
   wherein the clamping assembly defines an aperture, and wherein the securing device has a body and a projection extending from the body, the body extending through the aperture in the clamping assembly, and the projection engaging a region of the clamping assembly adjacent the aperture to hold the securing device thereon.

2. A capping assembly according to claim 1, wherein the tethering assembly further includes a ground anchor, the tethering member being provided to tether the clamping assembly to the ground anchor, the tethering member being attached to the ground anchor, and wherein the securing device comprises a gripping device for gripping the tethering member and attaching the tethering member to the clamping assembly.

3. A capping assembly according to claim 1, wherein the insertion member comprises a main part and a peripheral portion extending around the main part, the peripheral portion being configured for engaging the covering.

4. A capping assembly according to claim 1, including a sealing portion to engage and seal against the covering, the sealing portion being provided on the cap, wherein the cap has a central portion and an outer portion extending around the central portion, the outer portion having a sealing surface, the sealing portion being provided on the sealing surface to seal around the opening in the covering.

5. A capping assembly for mounting on a covering, the capping assembly comprising:
   a cap which can be disposed on the covering;
   a securing arrangement to enable the capping assembly to be secured on the covering; and
   an insertion member for insertion through the covering, wherein the cap can be attached to the insertion member;
   wherein the insertion member has first and second perpendicular dimensions, the first dimension being longer than the second dimension, and the capping assembly further includes an orienting arrangement to orient the insertion member, the orienting arrangement being manipulable to orient the insertion member to a desired orientation.

6. A capping assembly according to claim 5, wherein the orienting arrangement comprises two elongate flexible orienting members, each orienting member being attached to the insertion member at different points along the first dimension thereof.

7. A capping assembly for mounting on a covering, the capping assembly comprising:
   a cap which can be disposed on the covering;
   a securing arrangement to enable the capping assembly to be secured on the covering; and
   an insertion member for insertion through the covering, wherein the cap can be attached to the insertion member;
   wherein the cap includes a central portion and cooperating members which project from the central portion, whereby, in use, when the cap is disposed on the covering over the insertion member, the cooperating members extend through the covering, and the insertion member includes a cooperating formation for cooperating with the cooperating members and holding the cap on the insertion member.

8. A capping assembly according to claim 7, wherein when the cap is brought towards the covering, the cooperating members extend through the opening therein, and when the sealing portion sealingly engages the covering, the cooperating members cooperate with the second cooperating formations to hold the cap on the insertion member.

9. A method of mounting a capping assembly on a covering, wherein the method comprises;
providing a capping assembly comprising an insertion member, a cap and a securing arrangement;
inserting the insertion member through the covering;
disposing the cap on the covering and attaching the cap to the insertion member, wherein the method further includes securing the capping assembly to the covering using the securing arrangement;
wherein the insertion member has first and second perpendicular dimensions, wherein the first dimension is longer than the second dimension, and the method comprises forming an elongate opening in the covering, the opening having a length that is greater than the second dimension of the insertion member, and thereafter inserting the insertion member through the opening lengthwise in an orientation in which the first dimension extends transverse to the opening.

10. A method according to claim 9, wherein the securing arrangement comprises a securing device, and the securing arrangement comprises a holding formation that can hold the securing device, and wherein the method comprises disposing the securing device on the holding formation.

11. A method according to claim 9, wherein the securing arrangement includes a tethering assembly to secure the capping assembly to the ground, the tethering assembly comprising an elongate tethering member and a ground anchor, and the method includes driving the ground anchor into the ground with the tethering member attached thereto, and thereafter securing the tethering member to the securing device.

12. A method according to claim 9, wherein the capping assembly further includes an orienting arrangement to orient the insertion member when the insertion member has been inserted through the opening, and the method includes manipulating the orienting arrangement to move the insertion member to a sealing position in which the first dimension of the insertion member extends parallel to the opening.

13. A method according to claim 12, wherein the manipulation of the orienting arrangement comprises rotating the insertion member to the sealing position.

14. A method according to claim 12, including pulling the tethering member through the securing device to tighten the securing device against the insertion member when the insertion member has been oriented to the sealing position, and thereafter cutting the tethering member above the insertion member when the securing device has been tightened against insertion member.

15. A method according to claim 12, the orienting arrangement comprises two elongate flexible orienting members attached to the insertion member at different points along the first dimension thereof, and the method includes cutting each orienting member when the insertion member has been oriented to the sealing position.

16. A method according to claim 12, wherein the capping assembly comprises a sealing portion to engage and seal against the covering, and the method includes bringing the cap towards the covering, whereby the cooperating members extend through the opening, and when the sealing portion sealingly engages the covering, the cooperating members cooperate with the second cooperating formations to hold the cap on the insertion member.

* * * * *